(12) United States Patent
Liu et al.

(10) Patent No.: US 6,552,833 B2
(45) Date of Patent: *Apr. 22, 2003

(54) PROGRAMMABLE OPTICAL ADD/DROP MULTIPLEXER

(76) Inventors: Jian-Yu Liu, 4395 Grinnell Ave., Boulder, CO (US) 80303; Kuang-Yi Wu, 4720 Shoup Pl., Boulder, CO (US) 80303; Charles Wong, 4917 Thunderbird Dr. #11, Boulder, CO (US) 80303

( * ) Notice: Subject to any disclaimer, the term of this patent is extended or adjusted under 35 U.S.C. 154(b) by 0 days.

This patent is subject to a terminal disclaimer.

(21) Appl. No.: 09/864,538

(22) Filed: May 23, 2001

(65) Prior Publication Data

US 2001/0038479 A1 Nov. 8, 2001

Related U.S. Application Data

(63) Continuation of application No. 09/156,211, filed on Sep. 17, 1998, now Pat. No. 6,285,478, which is a continuation of application No. 09/048,557, filed on Mar. 26, 1998, now Pat. No. 6,208,442.
(60) Provisional application No. 60/043,012, filed on Apr. 15, 1997.

(51) Int. Cl.[7] ............................ H04J 14/02; H04J 14/06
(52) U.S. Cl. ......................................... 359/127; 359/122
(58) Field of Search ................................ 359/122, 124, 359/127, 128

(56) References Cited

U.S. PATENT DOCUMENTS

| | | | |
|---|---|---|---|
| 3,501,640 A | 3/1970 | Harris | 250/199 |
| 4,019,807 A | 4/1977 | Boswell et al. | 350/160 |
| 4,039,252 A | 8/1977 | Mizuno et al. | 350/160 |
| 4,378,955 A | 4/1983 | Bleha, Jr. et al. | 350/334 |
| 4,461,543 A | 7/1984 | McMahon | 350/383 |
| 4,516,837 A | 5/1985 | Soref | 350/347 |
| 4,566,761 A | 1/1986 | Carlsen et al. | 350/401 |
| 4,650,289 A | 3/1987 | Kuwahara | 350/375 |
| 4,685,773 A | 8/1987 | Carlsen et al. | 350/401 |
| 4,720,171 A | 1/1988 | Baker | 350/331 |
| 4,737,003 A | 4/1988 | Matsumura et al. | 350/96.14 |
| 4,893,931 A | 1/1990 | Lefevre et al. | 356/351 |
| 4,896,947 A | 1/1990 | Leenhouts | 350/337 |
| 4,919,522 A | 4/1990 | Nelson | 359/246 |

(List continued on next page.)

FOREIGN PATENT DOCUMENTS

| | | |
|---|---|---|
| EP | 0 762 690 A2 | 12/1997 |
| EP | 0 905 936 A2 | 3/1999 |
| WO | WO 97/09536 | 3/1997 |
| WO | WO 98/47254 | 10/1998 |

OTHER PUBLICATIONS

Inoue et al., "A Four–Channel Optical Waveguide Multi/Demultiplexer for 5–Ghz Spaced Optical FDM Transmission", *Journal of Lightwave Technology*, 6:2 (1998) 339–345.

(List continued on next page.)

*Primary Examiner*—Leslie Pascal

(57) ABSTRACT

An optical wavelength division multiplex (WDM) demultiplexer can be provided in substantially passive form. In one embodiment a wavelength filter separates alternate channels to provide a first output containing even-numbered channels and a second output containing odd-numbered channels, each output having channels separated by a bandwidth twice the channel separation bandwidth of the original WDM signal.

44 Claims, 13 Drawing Sheets

U.S. PATENT DOCUMENTS

| | | | |
|---|---|---|---|
| 4,952,030 A | 8/1990 | Nakagawa et al. | 350/337 |
| 4,989,941 A | 2/1991 | Soref | 350/96.18 |
| 4,999,619 A | 3/1991 | TeVelde | 340/784 |
| 5,013,140 A | 5/1991 | Healey et al. | 350/347 |
| 5,105,289 A | 4/1992 | Sonehara et al. | 359/70 |
| 5,162,944 A | 11/1992 | Yamamoto et al. | 359/247 |
| 5,165,104 A | 11/1992 | Weverka | 385/7 |
| 5,185,824 A | 2/1993 | Grimes et al. | 385/19 |
| 5,305,136 A | 4/1994 | Smith | 359/247 |
| 5,317,658 A | 5/1994 | Bergland et al. | 385/16 |
| 5,363,228 A | 11/1994 | DeJule et al. | 359/117 |
| 5,381,250 A | 1/1995 | Meadows | 359/39 |
| 5,414,540 A | 5/1995 | Patel et al. | 359/39 |
| 5,477,350 A | 12/1995 | Riza et al. | 359/39 |
| 5,526,153 A | 6/1996 | Glance | 359/127 |
| 5,555,113 A | 9/1996 | Mulkens et al. | 359/63 |
| 5,596,661 A | 1/1997 | Henry et al. | 385/24 |
| 5,623,360 A | 4/1997 | Gesell et al. | 359/287 |
| 5,680,490 A | 10/1997 | Cohen et al. | 385/24 |
| 5,692,077 A | 11/1997 | Stone et al. | 385/16 |
| 5,694,233 A | 12/1997 | Wu et al. | 359/117 |
| 5,712,704 A | 1/1998 | Martin et al. | 356/351 |
| 5,724,165 A | 3/1998 | Wu | 359/117 |
| 5,726,723 A | 3/1998 | Wang et al. | 349/75 |
| 5,740,288 A | 4/1998 | Pan | 385/11 |
| 5,771,320 A | 6/1998 | Stone | 385/16 |
| 5,778,118 A | 7/1998 | Sridhar | 385/24 |
| 5,809,190 A | 9/1998 | Chen | 385/43 |
| 5,852,505 A | 12/1998 | Li | 359/118 |
| 5,854,666 A | 12/1998 | Fujimaki | 349/180 |
| 5,867,289 A | 2/1999 | Gerstel et al. | 359/110 |
| 5,867,291 A | 2/1999 | Wu et al. | 359/124 |
| 5,870,164 A | 2/1999 | Lu et al. | 349/124 |
| 5,877,876 A | 3/1999 | Birdwell | 359/39 |
| 5,883,687 A | 3/1999 | Lu et al. | 349/201 |
| 5,912,748 A | 6/1999 | Wu et al. | 359/117 |
| 5,933,207 A | 8/1999 | Wu | 316/99 |
| 5,936,697 A | 8/1999 | Yang | 349/180 |
| 5,943,151 A | 8/1999 | Grasso et al. | 359/161 |
| 5,946,116 A | 8/1999 | Wu et al. | 359/117 |
| 5,963,291 A | 10/1999 | Wu et al. | 349/196 |
| 5,978,116 A | 11/1999 | Wu et al. | 359/124 |
| 6,005,697 A | 12/1999 | Wu et al. | 359/117 |
| 6,005,995 A | 12/1999 | Chen et al. | 385/24 |
| 6,067,178 A | 5/2000 | Zheng | 359/124 |
| 6,094,246 A | 7/2000 | Wong et al. | 349/99 |
| 6,097,451 A | 8/2000 | Palmer et al. | 349/14 |
| 6,097,518 A | 8/2000 | Wu et al. | 359/128 |
| 6,111,625 A | 8/2000 | Ohta et al. | 349/141 |
| 6,115,401 A | 9/2000 | Scobey et al. | 372/100 |
| 6,130,971 A | 10/2000 | Cao | 385/31 |
| 6,134,358 A | 10/2000 | Wu et al. | 385/16 |
| 6,137,604 A | 10/2000 | Bergano | 359/124 |
| 6,137,606 A | 10/2000 | Wu et al. | 359/124 |
| 6,141,076 A | 10/2000 | Liu et al. | 349/134 |
| 6,144,494 A | 11/2000 | Shirasaki et al. | 359/578 |
| 6,151,158 A | 11/2000 | Takeda et al. | 359/341 |
| 6,166,838 A | 12/2000 | Liu et al. | 359/128 |
| 6,175,432 B1 | 1/2001 | Wu et al. | 359/124 |
| 6,201,593 B1 | 3/2001 | Wong et al. | 349/180 |
| 6,208,442 B1 | 3/2001 | Liu et al. | 359/127 |
| 6,212,313 B1 | 4/2001 | Li | 385/24 |

OTHER PUBLICATIONS

Madsen et al., "A General Planar Waveguide Autoregressive Optical Filter", *Journal of Lightwave Technology*, 14:3 (1996) 437–447.

C.K. Madsen, "A Multiport Frequency Band Selector with Inherently Low Loss, Flat Passbands, and Low Crosstalk", *IEEE Photonics Technology Letters*, 10:12 (1998) 1766–1768.

Chung et al., "Analysis of a Tunable Multichannel Two–Mode–Interference Wavelength Division Multiplexer/Demultiplexer", *Journal of Lightwave Technology*, 7:5 (1989) 766–777.

Liu et al., "Digitally Programmable Wavelength–Switching Technology", *IEEE/LEDS Summer Topical Meetings* Aug. 1997, 9–10.

Madsen, "Efficient Architectures for Exactly Realizing Optical Filters with Optimum Bandpass Designs", *IEEE Photonics Technology Letters*, 10:8 (1998) 1136–1138.

Dingel et al., "Multifunction optical filter with a Michelson–Gires–Tournois interferometer for wavelength–division–multiplexed network system applications", *Optics Letters*, 23:14 (1998) 1099–1101.

Madsen et al., "Optical All–Pass Filters for Phase Response Design with Applications for Dispersion Compensation", *IEEE Photonics Technology Letters*, 10:7 (1998) 994–996.

Nosu et al., "Optical FDM Transmission Technique", *Journal of Lightwave Technology*, LT–5:9 (1987) 1301–1308.

Dingel et al., "Optical wave–front transformer using the multiple–reflection interference effect inside a resonator", *Optics Letters*, 22:9 (1997) 1449–1451.

Dingel et al., "Properties of a Novel Noncascaded Type, Easy–to–Design, Ripple–Free Optical Bandpass Filter", *Journal of Lightwave Technology*, 17:8 (1999) 1461–1469.

Peng et al., "Optical implementation of regular rectangular CC–banyon network by using polarizing beam splitters", *Optics Communications*, 117: (1995) 37–42.

Noguchi et al., "A Rearrangeable Multichannel Free–Space Optical Switch Based on Multistage Network Configuration", *Journal of Lightwave Technology*, 9:12 (1991) 1726–1732.

Kuroyanagi et al., "Optical Cross–Connect Architecture Using Free–Space Optical Switches Based on PI–LOSS Topology", *Fujitsu Laboratories Ltd.*, (1995) 2112–2117.

Brackett, "Dense Wavelength Division Multiplexing Networks: Principles and Applications", *IEEE Journal on Selected Areas in Communications*, 8:6 (1990) 948–964.

Ammann, "Synthesis of Electro–Optic Shutters having a Prescribed Transmission vs. Voltage Characteristic" *Journal of the Optical Society of America*, 56:8 (1966) 1081–1088.

Harris et al., "Optical Network Synthesis Using Birefringent Crystals v. Synthesis of Lossless Networks Containing Equal–Length Crystals and Compensators", *Journal of the Optical Society of America*, 54:10 (1964), 1267–1279.

Ammann et al., "Optical Network Synthesis Using Birefringent Crystals v. Synthesis of Lossless Networks Containing Equal–Length Crystals and Compensators", *Journal of the Optical Society of America*, 56:12 (1966), 1746–1754.

Kuznetsov, "Cascaded Coupler Mach–Zehnder Channel Dropping Filters for Wavelength–Division–Multiplexed Optical Systems", *Journal of Lightwave Technology*, 12:2 (1994) 226–230.

Takato et al., "Silica–Based Integrated Optic Mach–Zehnder Multi/Demultiplexer Family with channel Spacing of 0.01–250 nm", *IEEE Journal on Selected Areas in Communications*, 8:6 (1990) 1120–1127.

Verbeek et al., "Integrated Four–Channel Mach–Zehnder Multi/Demultiplexer Fabricated with Phosphorous Dopes $SiO_2$ Waveguides on Si", *Journal of Lightwave Technology*, (1988) 1011–1015.

Glance, B., "Tunable Add/Drop Optical Filter Providing Arbitrary Channel Arrangements", *IEEE Photonics Technology Letters*, 7:11 (1995) 1303–1305.

Suzuki et al., "Switches Integrated Multichannel Optical Wavelength Selective Incorporating an Arrayed–Waveguide Grating Multiplexer and Thermo–optic Switches", *Journal of Lightwave Technology*, 16:4 (1998) 650–652.

Carlsen et al.; "Flat Passband Birefringent Wavelength–Division Multiplexers"; Electronic Letters, vol. 23, 1987; pp. 106–107.

Fujii et al.; "Wavelength–Division Multi/Demultiplexer Utilizing Optically Active Crystals"; Journal of Lightwave Technology, vol. 8, No. 7, Jul. 1990; pp. 1051–1054.

Ishio et al.; "Review and Status of Wavelength–Division–Multiplexing Technology and Its Application"; Journal of Lightwave Technology; vol. LT–2, No. 4, Aug. 1984; pp. 448–463.

Mahlein; "Fiber–Optic Communication in the Wavelength–Division Multiplex Mode"; Fiber and Integrated Optics, vol. 4, No. 4, Jun. 1982; pp. 339–372.

Melman et al.; "Tunable Birefringent Wavelength–Division Multiplexer/Demultiplexer"; Electronic Letters; vol. 21, 1985; pp. 634–635.

Senior et al.; "Devices for Wavelength Multiplexing and Demultiplexing", IEEE Proceedings, vol. 136, Pt. J, No. 3, Jun. 1989; pp. 183–202.

Damask et al.; "Wavelength–Division Multiplexing using Channel–Dropping Filters", Journal of Lightwave Technology; vol. 11, No. 3, Mar. 1993; pp. 424–428.

Derr et al.; "An Optical Infrastructure for Future Telecommunications Networks"; IEEE Communications; No. 11, Nov. 1995; pp. 84–88.

Hirabayashi et al.; "Tunable Wavelength–Selective Liquid Crystal Filters for 600–Channel FDM System"; IEEE Photonics Technology Letters; vol. 4, No. 6, Jun. 1992; pp. 597–599.

Saleh et al.; "Two–Stage Fabry–Perot Filters as Demultiplexers in Optical FDMA LAN's"; Journal of Lightwave Technology; vol. 7, No. 2, Feb. 1989; pp. 323–329.

Smith et al.; "Cascaded Acoustooptic/Fiber Fabry–Perot Filter with Finesse over 2000"; IEEE Photonics Technology Letters; vol. 5, No. 2, Feb. 1993; pp. 189–191.

Takahashi et al.; "Wavelength Multiplexer Based on $SiO_2$–$Ta_2O_5$ Arrayed–Waveguide Grating"; Journal of Lightwave Technology; vol. 12, No. 6, Jun. 1994; pp. 989–995.

Mizouochi et al., "All–fiber add/drop multiplexing of 6 ×10 Gbit/s using a photo–induced Bragg grating filter for WDM networks", *OFC 96 Technical Digest*, 116–117.

Spectral Response of Wavelength Slicing

PROGRAMMABLE OPTICAL ADD/DROP MULTIPLEXER

CROSS REFERENCE TO RELATED APPLICATIONS

The present application is a continuation of U.S. patent application Ser. No. 09/156,211, filed Sep. 17, 1998, now U.S. Pat. No. 6,285,478 which is a continuation of U.S. patent application Ser. No. 09/048,557, now U.S. Pat. No. 6,208,442 filed Mar. 26, 1998, entitled "PROGRAMMABLE OPTICAL ADD/DROP MULTIPLEXER", which claims priority of Ser. No. 60/093,012 filed Apr. 15, 1997 are both incorporated herein by this reference.

Cross-reference is made to U.S. Pat. No. 5,694,233 entitled "Switchable Wavelength Router," U.S. patent application Ser. No. 08/739,424 entitled "Programmable Wavelength Router" filed Oct. 29, 1996, and U.S. patent application Ser. No. 60/043,012 entitled "N×M Optical Wavelength Routing Switch", all incorporated herein by reference.

FIELD OF THE INVENTION

The present invention relates, in general, to communication systems and, particularly, to an optical wavelength multiplexer/demultiplexer usable in connection with wavelength division multiplex (WDM) optical communication.

BACKGROUND OF THE INVENTION

A number of optical communication devices and systems are configured for use with optical wavelength division multiplexing (WDM). In WDM, several information signals can be transmitted over a single optical fiber. Each information signal is used to modulate a different wavelength carrier signal or channel. Many operations in such systems require multiplexing or demultiplexing the signals. Multiplexing generally involves combining multiple channels into a single WDM signal. Demultiplexing generally involves extracting or separating individual channels, e.g. for subsequent processing such as routing to desired pathways and/or outputting to output ports. Each channel occupies or is contained within a predefined frequency range. In many (but not all) systems the frequency ranges defining the boundaries for the channels are equal in bandwidth, evenly spaced and contiguous. Since the total bandwidth for a WDM signal cannot be significantly smaller than the sum of the bandwidths of the component channels, for a given bandwidth WDM signal, the number of channels that can be defined (and thus the number of separate information signals that can be carried) increases as the bandwidth of the channels decreases. Thus it is not surprising that systems have tended toward increasingly-smaller channel spacing to increase the number of optical channels. Many systems would, accordingly, benefit from optical devices which can successfully accommodate channel bandwidths of, for example, 100 GHz, 50 GHz or even less.

Unfortunately, as the number of channels is increased, the channel spacing is decreased so that functions such as demultiplexing/multiplexing have become increasingly difficult. In addition to the difficulty of constructing devices with sufficient accuracy to, even theoretically, demultiplex such narrow-bandwidth channels, and without wishing to be bound by any theory, it is believed narrow-bandwidth demultiplexing is particularly susceptible to factors such as wavelength drift and/or channel cross-talk.

Accordingly, it would be useful to provide a demultiplexer/multiplexer which can provide useful results with respect to narrow-bandwidth channels such as 100 GHZ, 50 GHz channels or smaller, preferably while being relatively tolerant of wavelength drift and/or providing relatively low channel cross-talk.

It is, in general, believed possible to construct devices which permit channels to be controllably provided to desired output ports (i.e. routers) and/or permit a new information signal to replace an existing information signal in a channel of a WDM (i.e. an add/drop device). It is believed some such devices involve active (i.e. controlled) channel separation in which binary or other control signals function to achieve the desired routing or add/drop configuration. It is believed that many such systems are configured such that a change in the control signals (i.e. a change in routing or add/drop function) affects (e.g. interrupts or "touches") all or substantially all of the channels in the WDM signal. While this may be acceptable for some applications, it is believed other applications (such as asynchronous, continuous, real time and/or time critical signals) would be more readily served by devices which permitted re-routing or add/drop changes of only desired channels while leaving other channels in a WDM signal substantially unchanged or untouched.

Accordingly, it would be useful to provide a demultiplexer/multiplexer, and associated devices such as add/drop devices, routers, and the like, particularly narrow-bandwidth channel systems, in which the multiplex/demultiplex function was substantially passive and/or in which channels not being changed by a change in routing or add/drop function would be substantially unaffected or untouched.

SUMMARY OF THE INVENTION

The present invention includes a recognition of problems of previous approaches, including as described above. The present invention involves a wavelength filter which operates by providing different polarizations to contiguous channels. Thus, if a plurality of channels are, in order, assigned sequential numbers, odd-numbered channels will be provided with a first polarization while even numbered channels are provided with a second polarization. Such change in polarization permits the odd-numbered and even-numbered channels to be placed on different optical paths. In this way, the present invention provides for a single device or stage that separates a plurality of non-contiguous channels, all at once, from remaining channels. The separation of formerly "interdigitated" channels means that the channels in each path are separated by a channel spacing twice the separation between channels of the original WDM signal (for the typically evenly-spaced channels). The system is scalable in the sense that each of the two resulting double-spaced channel signals can be further separated into, e.g., two signals containing alternately-numbered channels which are quadruply spaced. For example, an original WDM signal has channel separation of 100 Gigahertz (GHz), a first iteration of a wavelength filter as described herein will result in two signals (one carrying channels 1, 3, 5, 7 . . . , the other carrying channels 2, 4, 6, 8 . . . ) with the channels of each of the two signals being separated by 200 GHz. A second iteration of wavelength filtering (using a different filter, as described below) will result in two signals arising from each of the first and second filtered signals, for a total of four signals (the first having channels 1, 5, 9 . . . , the second having channels 3, 7, 11 . . . , the third having channels 2, 6, 10 . . . , the fourth having channels 4, 8, 12 . . . ) with the channels in each of these four signals being separated from adjacent channels by 400 GHz. The process may be repeatedly iterated sufficiently to achieve desire separation of channels. For example it is at least theoretically possible to iterate until there is one channel per signal (i.e. the WDM signal has been fully demultiplexed) using the described wavelength filters, or more conventional demultiplexing devices (conventional wavelength filtering) and methods can be applied to resultant signals (502, 503 or 504, 505, 506, 507, or the like) in which the increased channel separation permits successful application of conventional demultiplexing technology, preferably with acceptable wavelength drift tolerance and acceptably low cross talk. Although a "channel" may refer to a single frequency range used to carry a single information signal, it is possible to decompose or demultiplex a WDM signal only partially such that one or more of the outputs of the demultiplexer may include more than one channel and may itself be a WDM signal (with a smaller bandwidth than the original WDM signal).

Because the demultiplexing is provided in the absence of control signals and is substantially passive, the demultiplexed signals are provided as substantially continuous, uninterrupted signals. Accordingly, in one embodiment the demultiplexer can be used in conjunction with other devices to achieve, e.g., add/drop functionality in a manner such that changing the add/drop function (such as providing an add signal to a different channel) can be achieved without affecting, interrupting or "touching" any of the channels other than those involved in the change.

DETAILED DESCRIPTION OF THE PREFERRED EMBODIMENTS

Figure 1:
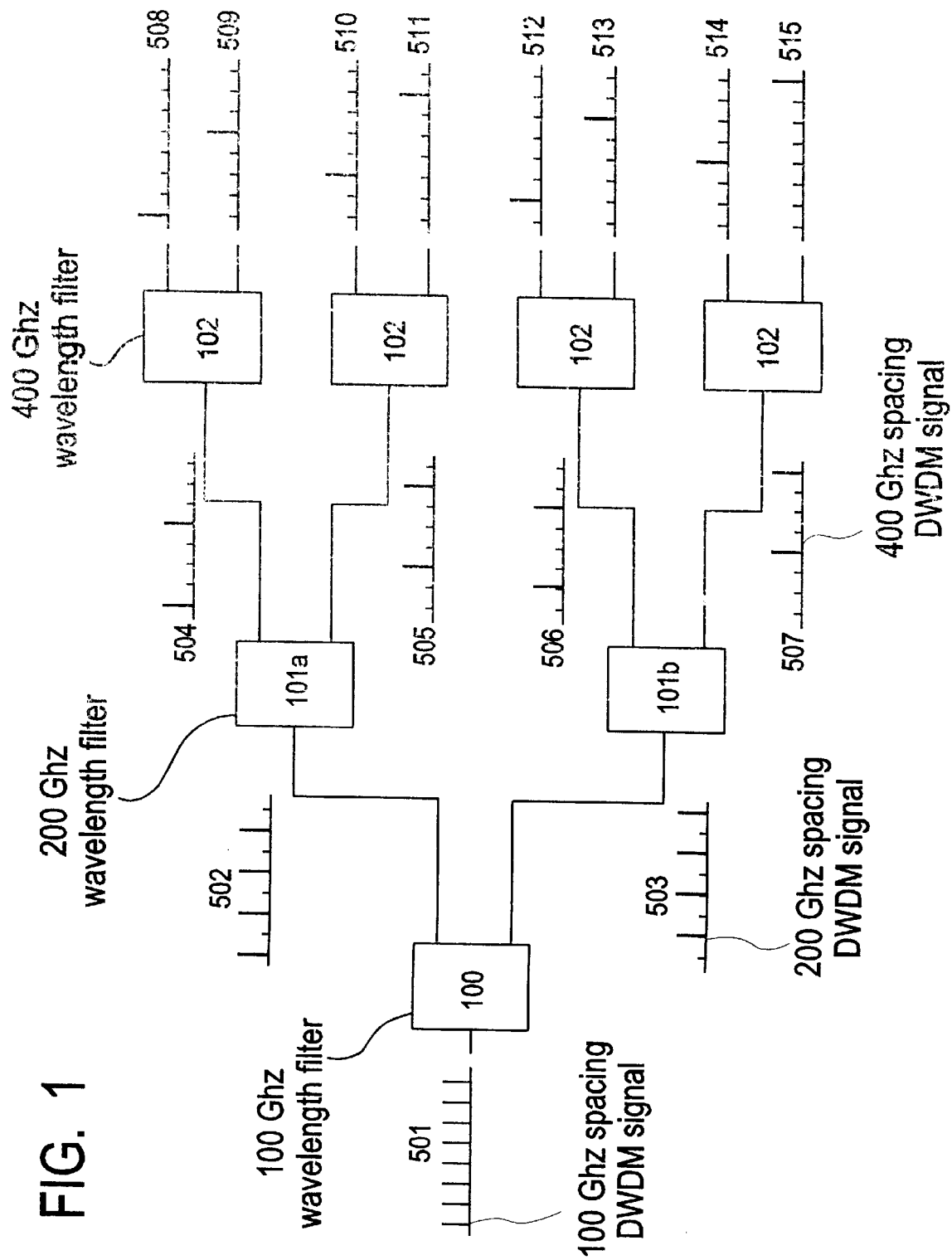
FIG. 1 is a block diagram of a three-stage demultiplexer according to an embodiment of the present invention.

In the embodiment depicted in FIG. 1, an 8-channel WDM signal 501 is provided with channels having center frequencies evenly spaced 100 GHz apart. In the illustration of FIG. 1, the horizontal axis 501 represents wavelength and vertical lines represent the position of channel center frequencies. (For example, the center frequencies might be 193.5, 193.6, 193.7, 193.8, 193.9, 194.0, 194.1 and 194.2 terraHertz.

The WDM signal 501 is received by a wavelength filter according to an embodiment of the present invention 100, which outputs first and second signals 502, 503. If we assign number to the channels, in order, (so that, for example "channel 1" is the channel centered at 193.5 Thz, "channel two" is the channel centered at 193.6 Thz, and so on) output signal 502 contains only the odd-numbered channels (channels 1, 3, 5 and 7, with center frequencies of 193.5, 193.7, 193.9, 194.1 Thz, respectively, in the present example), and the second signal 503 contains only the even-numbered channels (channels 2, 4, 6, 8, with center frequencies of 193.6, 193.8, 194.0 and 194.2 Thz, respectively, in the present example). Accordingly, although all channels have been retained, because of separation of the interdigitated even-numbered and odd-numbered channels, the channel center frequencies in each of the two signals 502, 503 are separated by 200 GHz, i.e., twice the channel separation of the original WDM signal 501.

Figure 3A:
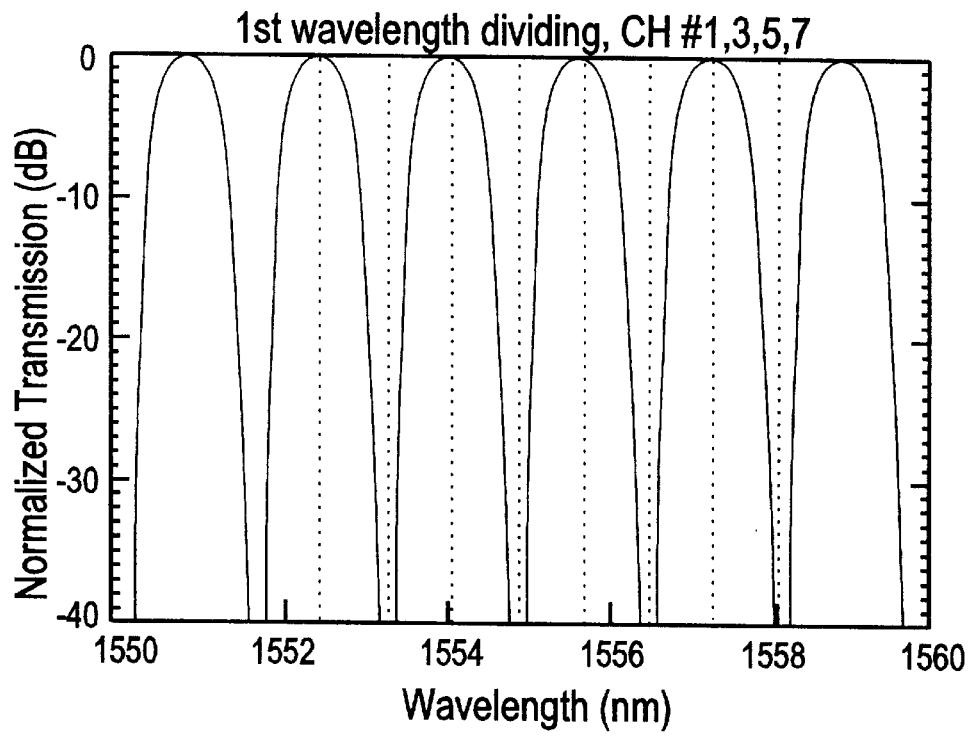
FIGS. 3a–3d depict normalized transmission response across a wavelength band for filters that may be used in connection with the embodiment of FIG. 1.
Figure 3B:
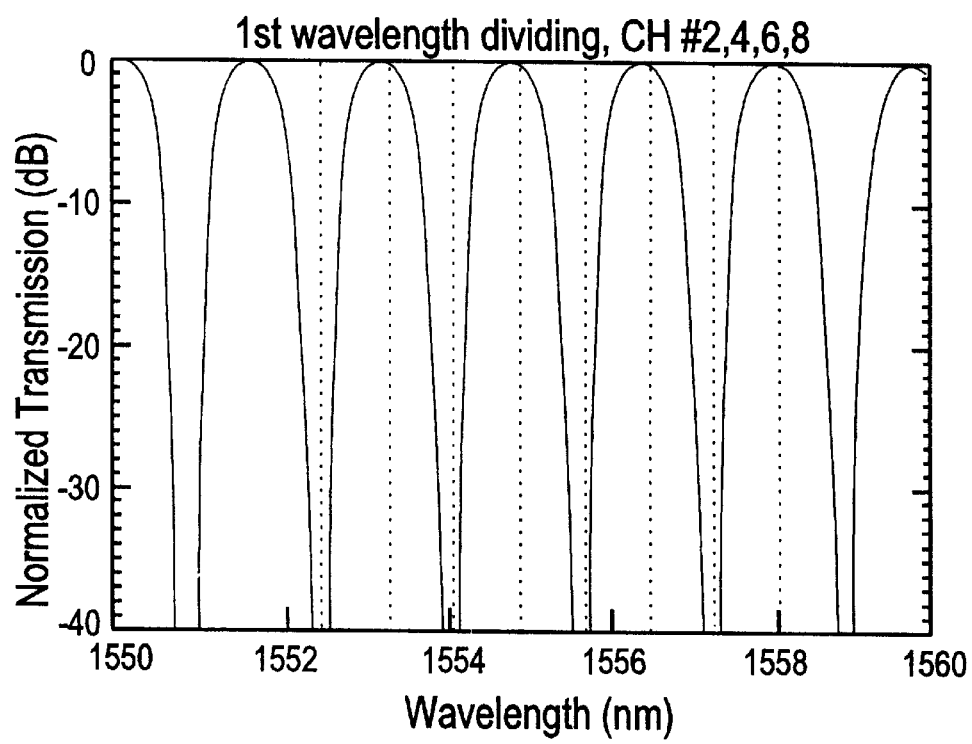
Figure 6A:
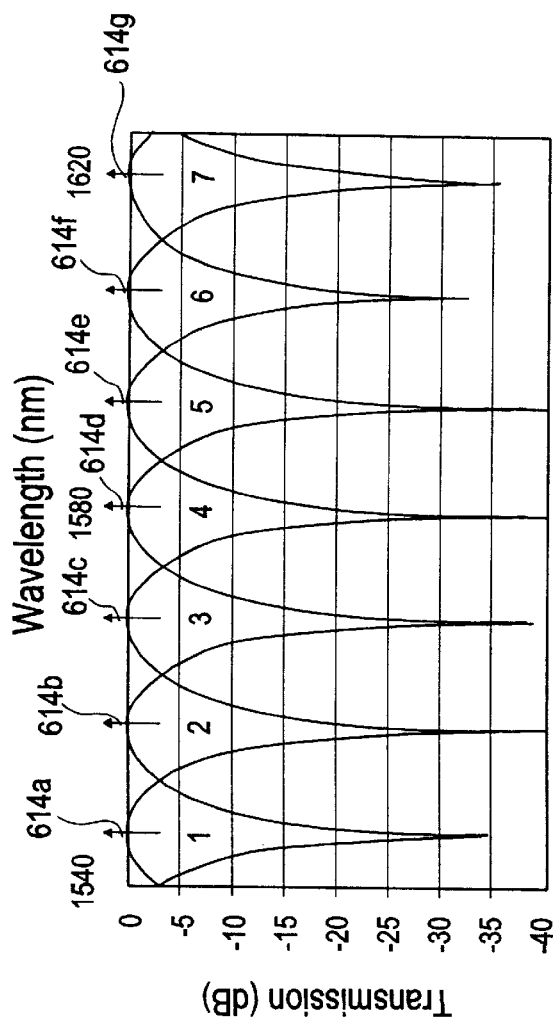
FIG. 6A depicts the transmission spectra of a single birefringent element placed between crossed and parallel polarizers.

The wavelength filter 100 can be similar to that described in U.S. Pat. No. 5,694,233 and/or as described in Ser. No. 08/739,424 entitled "Programmable Wavelength Router" filed on Oct. 29, 1996, both incorporated herein by reference. However, preferably the wavelength filter 100 is passive and contains no control element or controllable polarization converter. In one embodiment, the wavelength filter 100 includes a first component for providing first and second (different) polarizations to the odd-numbered and even-numbered channels, respectively, and a second component for physically separating (providing different paths) to the differently polarized components. In one embodiment, the first component can be formed from a plurality of waveplates or birefringent elements. The birefringent elements are oriented at different optic axis angles with respect to one another. FIG. 3a depicts the transmission of the filter 100, according to one embodiment of the invention, for light with a first (e.g. vertical) polarization, and FIG. 3b depicts transmission through the filter of this embodiment for a second (e.g. horizontal) polarization. Preferably the transmission envelopes are shaped to provide sufficient width, as depicted, to tolerate expected wavelength drift while still being sufficiently narrow to achieve the necessary discrimination with respect to other channels. In one embodiment, suitable filters may be made as described in U.S. Pat. No. 5,694,233 titled "Switchable Wavelength Router" and/or U.S. patent application Ser. No. 09/020,706, titled "Temperature Insensitive Polarization Filter", both incorporated herein by reference. Basically, the polarization filter is composed of multiple birefringent elements, each having a certain predefined amount of phase retardation. By orientating these elements in different angles the combined transmission spectrum can be shaped to a square-wave like periodic function. The periodicity of the transmission spectrum can be controlled by increasing or decreasing the amount of phase retardation of the birefringent elements. A simple spectral response 612 of a birefringent element 618 (FIGS. 6B,C) placed between crossed (622a,b) and parallel (616a,b) polarizers is shown in FIG. 6A, where the two orthogonal spectra demonstrate the concept of coding the bandwidth into vertical (channels 1, 3, 5, 7; 614a,c,e,g) and horizontal polarizations (channels 2, 4, 6; 614b,d,f), respectively.

Accordingly, the output of the first component of the filter is a signal in which even-numbered channels have a first polarization and odd-numbered channels have a second polarization. This output is then applied to a device for physically separating the differently-polarized components, such as a polarization beam separator (PBS). One example of a component that may be used is that sold under the model number 05FC16 available from Newport of Irvine, Calif.

Figure 2:
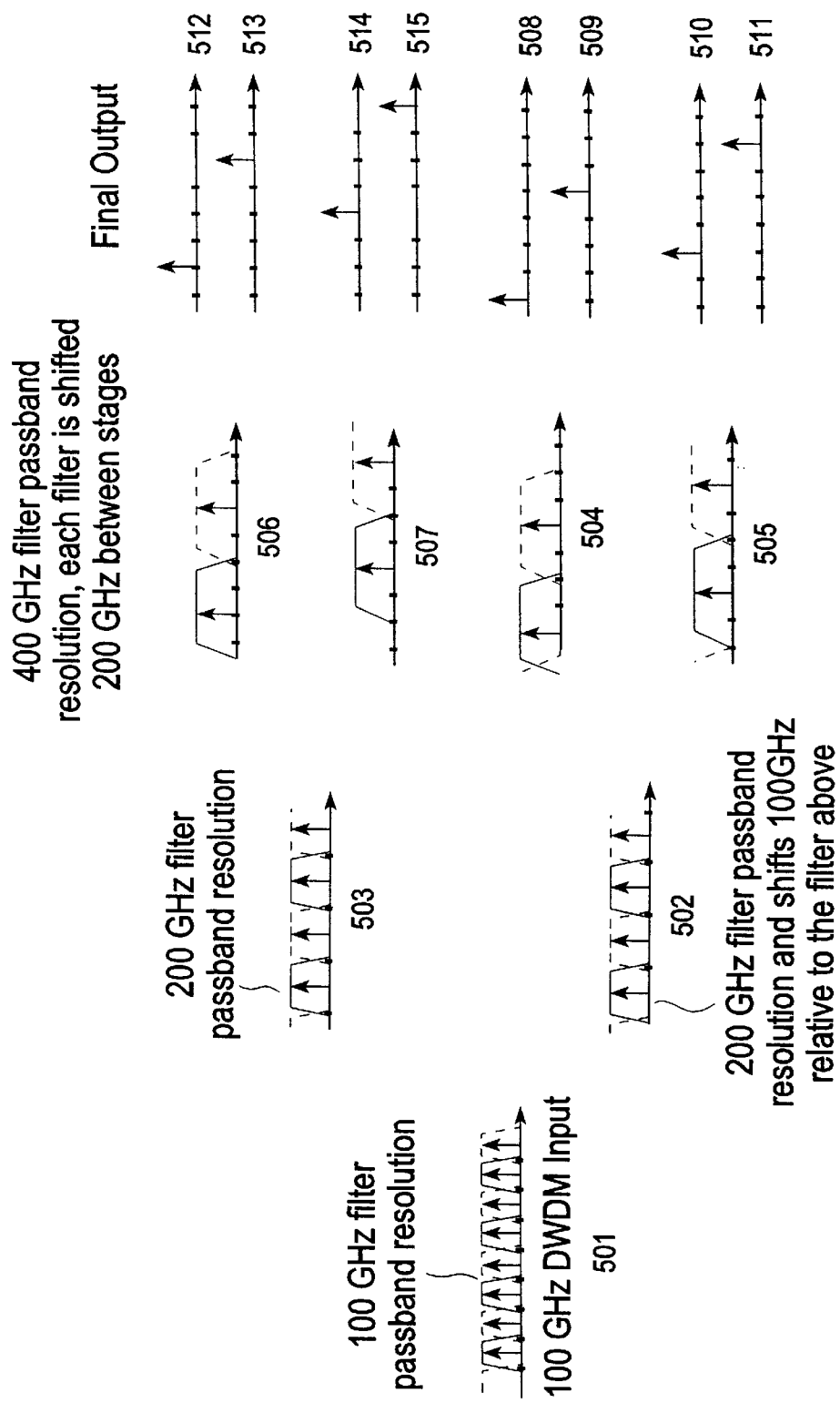
FIG. 2 is a diagram illustrating channel separation of various signals in portions of FIG. 1.
Figure 3C:
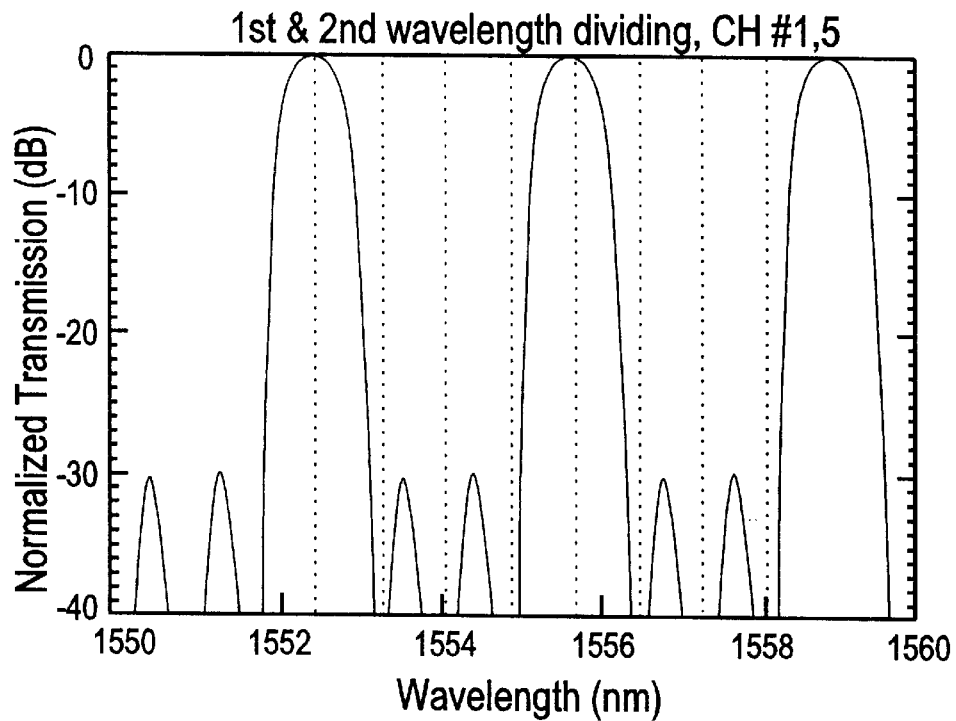
Figure 3D:
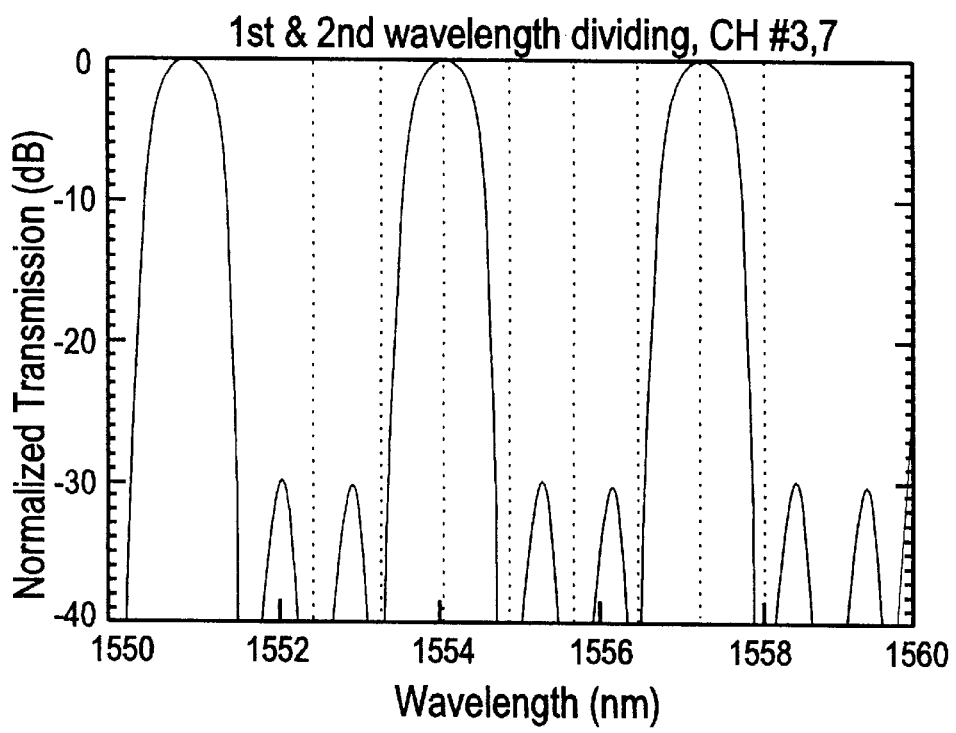

Returning to FIG. 1, and as further illustrated in FIG. 2, the second stage separation involves providing the first stage output signals 502, 503 as input to second stage wavelength filters 101a, 101b respectively. The second stage filters 101a, 101b are similar in nature to the first stage filter 100 but have transmission bands which are spaced apart so as to select or separate every other channel of the input signals 502, 503, i.e., every fourth channel of the original WDM signal 501. FIGS. 3c and 3d (illustrating cascading stages) show transmission characteristics of filter 101a for vertically and horizontally oriented polarized channels which accordingly will act to separate, e.g. channels 1 and 5 from channels 3 and 7. The transmission characteristics for filter 101b will be clear to those of skill in the art after understanding the present disclosure.

Filter 101a will output two signals 504, 505 and filter 101b will also output two signals 506, 507. The second stage output signals 504, 505, 506, 507 will contain channels which are spaced apart by 400 GHz, i.e., twice the channel spacing of the first stage output signals 502, 503 and four times the channel spacing of the original WDM signal. In the present example, signal 504 includes channels centered at 193.5 and 193.9 THz, signal 505 includes channels centered at 193.7 and 194.1 THz, signal 506 includes channels centered at 193.6 and 194.0 THz, and signal 507 includes channels centered at 193.8 and 194.2 THz. Conventional means may be used to separate the two channels in each of the third stage output signals 504, 506, 505, 507 such as by using a conventional multi-layered dielectric thin-film wavelength filter 102 or, if desired, a wavelength filter as described herein can be used, to provide the fully multiplexed output, i.e. 8 output signals each containing one of the original 8 channels of the original WDM signal 508 through 515.

Figure 4A:
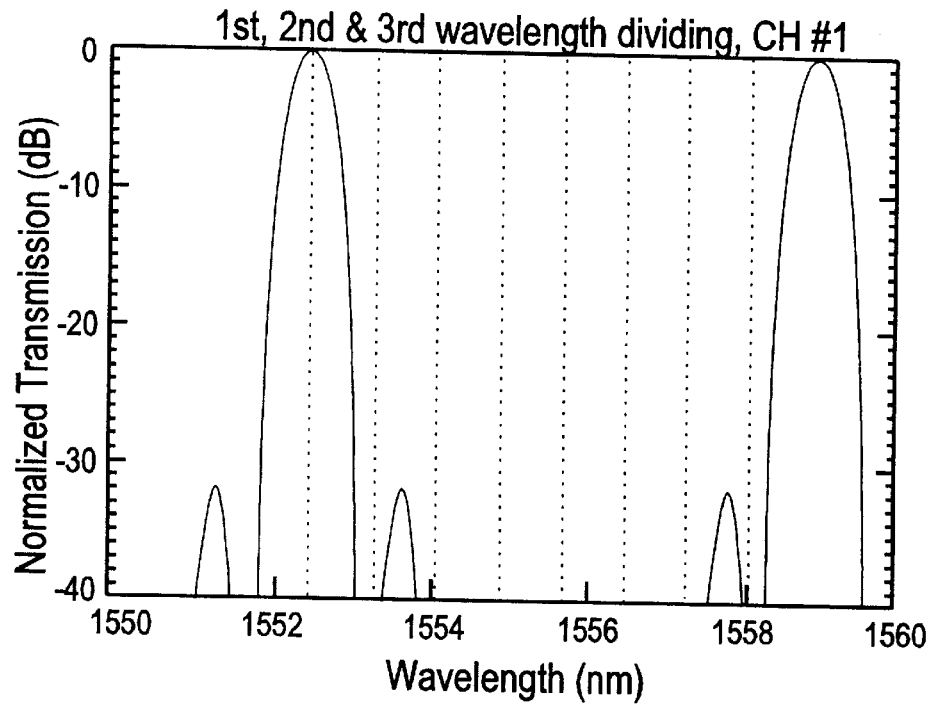
FIGS. 4a and 4b depict transmission response of a filter for separating components.
Figure 4B:
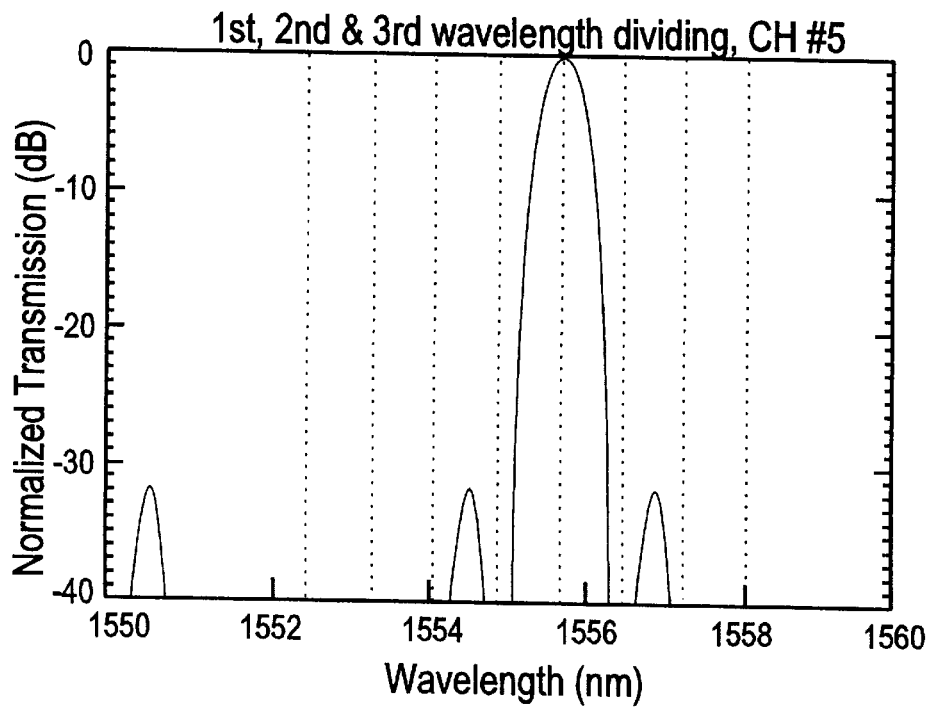

FIGS. 4a and 4b depict transmission characteristics of a filter appropriate for separating components of signal 504, i.e. separating channel 1 from channel 5.

Figure 7:
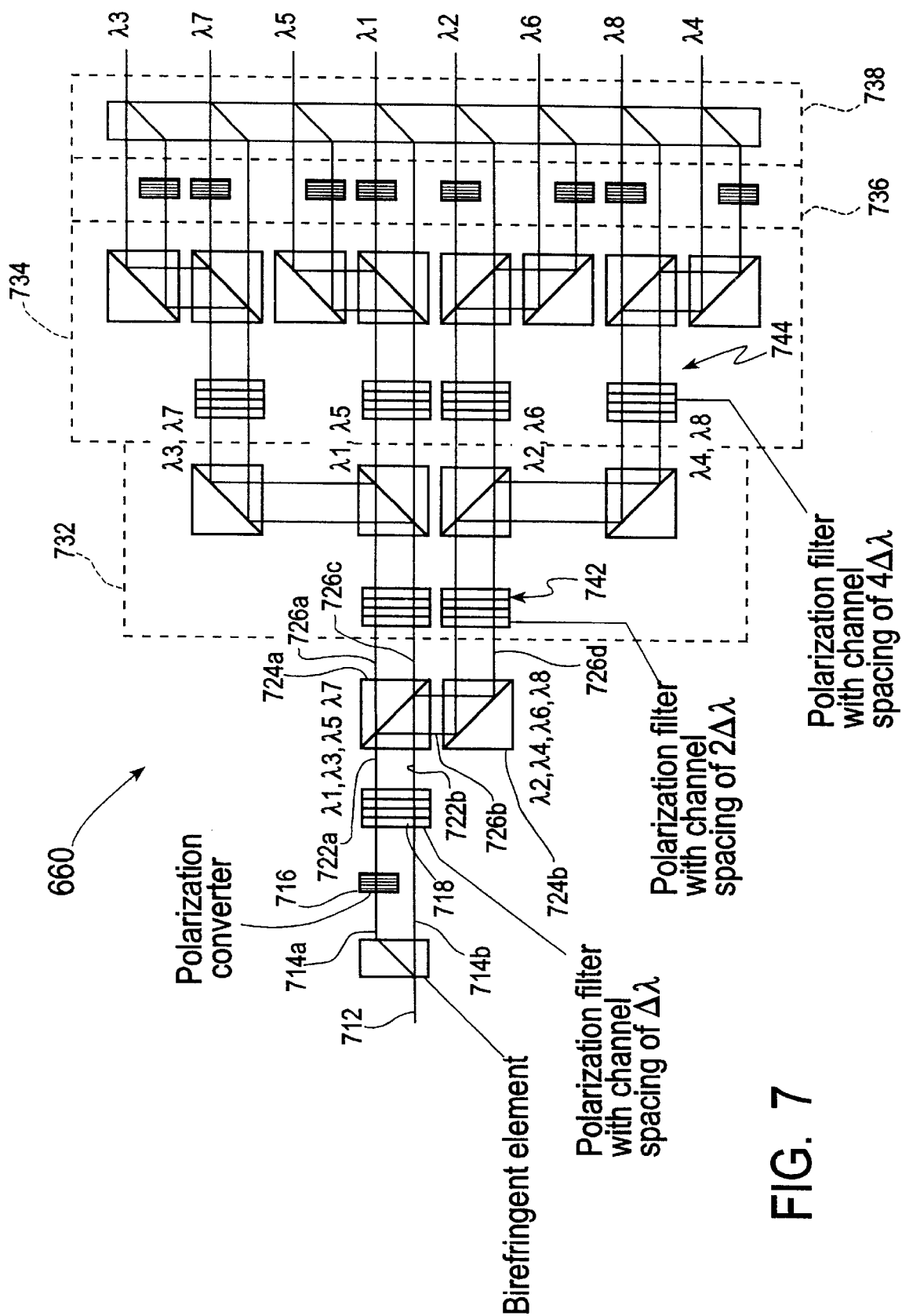
FIG. 7 illustrates a block diagram of an eight-channel demultiplexer/multiplexer according to an embodiment of the present invention.

The block diagram of FIG. 7 illustrates the function described above. In the embodiment of FIG. 7, a DWDM signal composed of 8 optical channels 712 is provided to the device 600. The optical signal 712 is decomposed into two orthogonal polarization components, namely, vertical and horizontal polarization, respectively 714a,b. One of the light paths 714a is passed through a polarization converter 716 such that both light paths have the same state of polarization (vertical or horizontal). These two beams then pass through a polarization filter 718 such that the odd-channels are coded with (output in) horizontal polarization and the even channels are coded within vertical polarization. These two polarizations are then separated by the following polarization beam separator (PBS), 724a,b which passes the horizontal polarization 726a,c straight through the PBS and deflects the vertical polarization 726b,d by 90°. Because the odd and even channels reside within the two polarizations respectively, they are spatially separated after the PBS. The same processes are repeated through the next two stages 732, 734 (followed by polarization conversion 736 and recombination 738), except with the filters 742, 744 equipped with broader spectral characteristics, as described.

Figure 8:
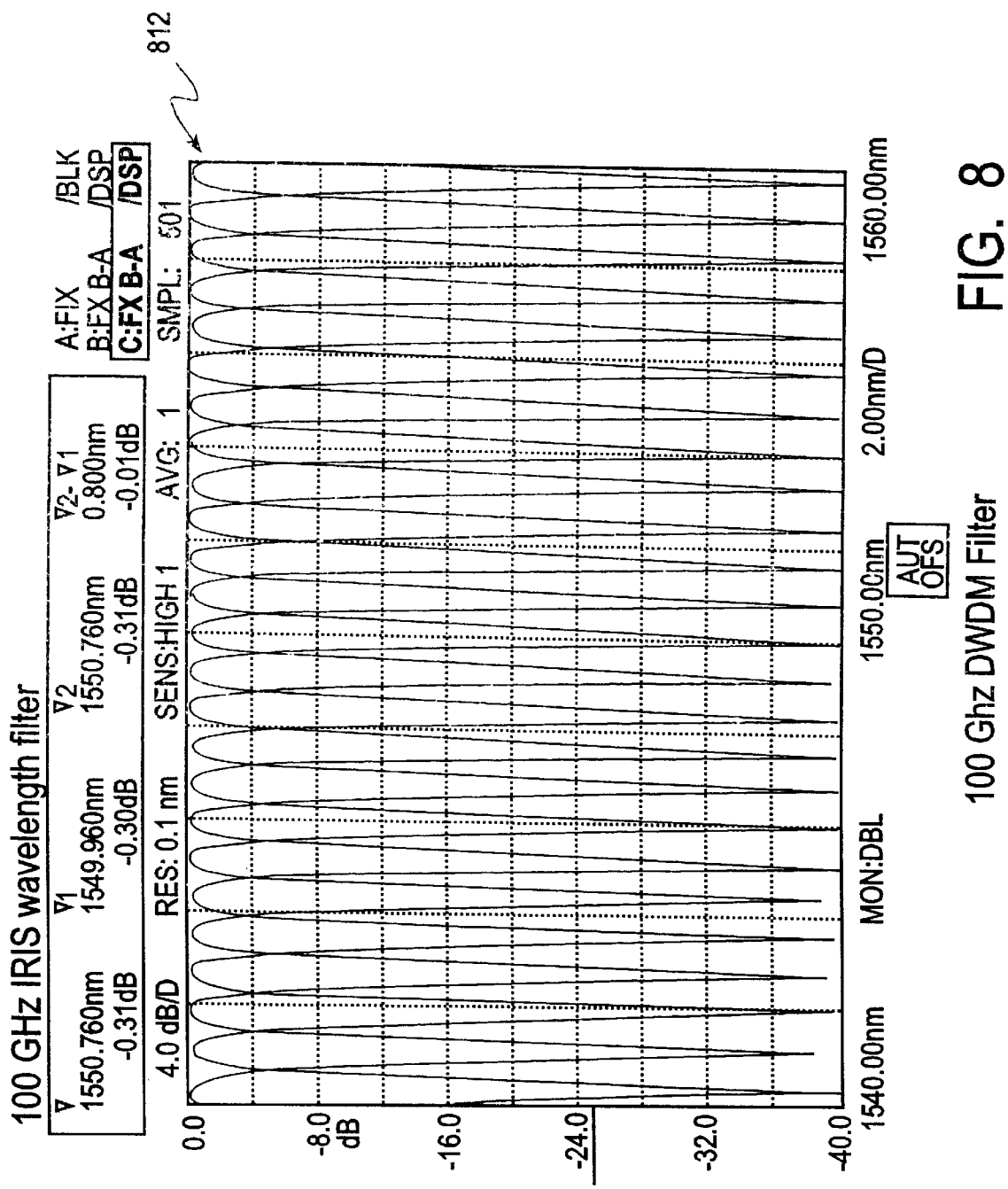
FIG. 8 shows experimental result of a 100 GHz 1×2 demultiplexer, indicating relatively flat-top spectral response has been achieved.

The experimental results of the first stage spectral response 812 is illustrated in FIG. 8, with 100 GHz channel spacing.

According to an embodiment of the present invention, multiplexing can be achieved using components and processes identical to or similar to those described above in connection with a demultiplexer, but operated in reverse order.

Figure 5:
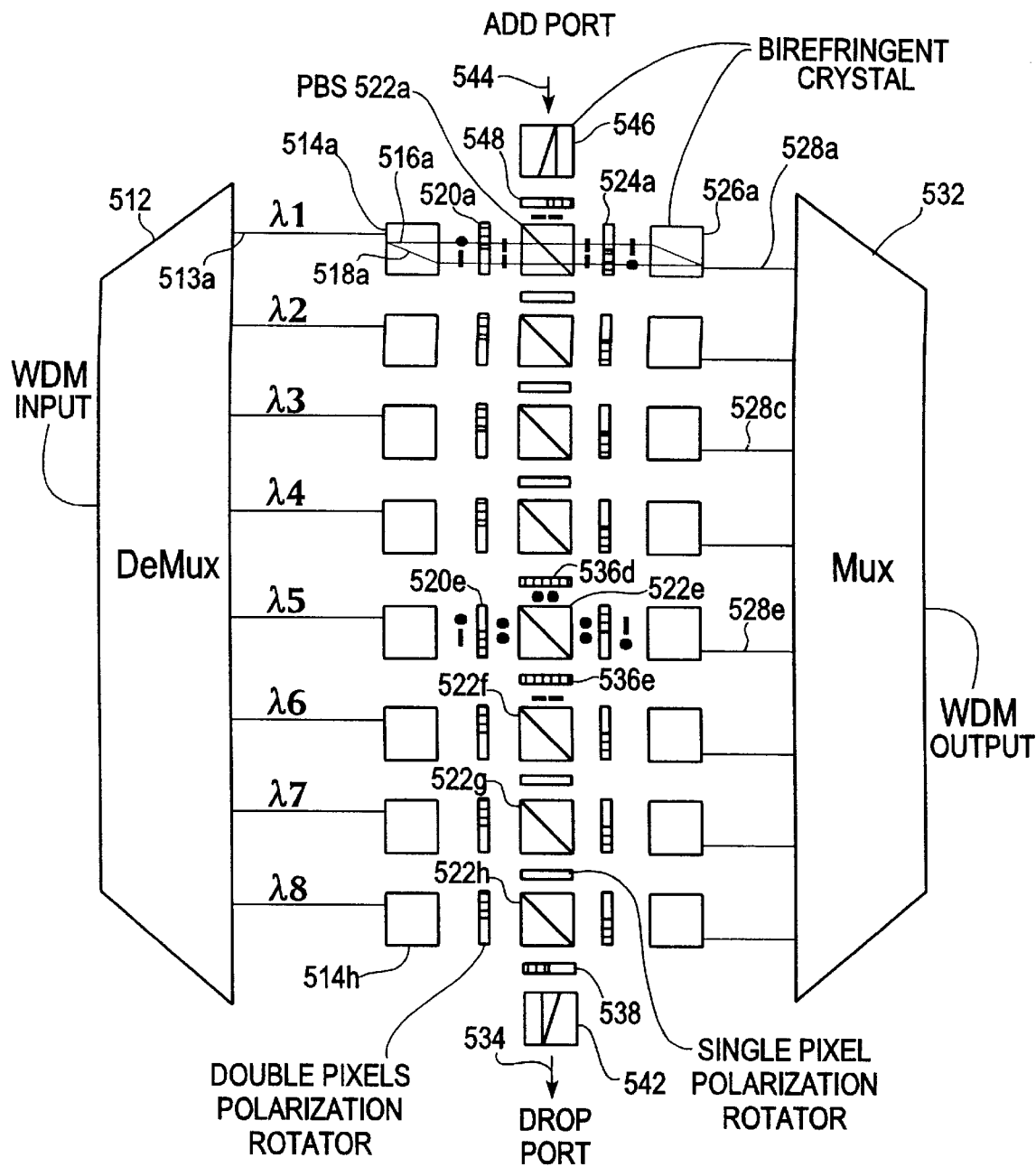
FIG. 5 depicts an add/drop device that can be used in connection with the demultiplexer of FIG. 1.

FIG. 5 depicts an add/drop device according to an embodiment of the present invention which can employ demultiplexer 512 of the type described above. The add/drop device of FIG. 5 can be used in connection with a passive demultiplexer 512 and is able to achieve a change in add/drop functionality (such as a change in the channel to which the add signal is provided) without affecting or interrupting channels which are not involved in the change. The demultiplexer 512 receives, in the depicted embodiment, an 8-channel WDM input and outputs each channel (indicated by $\lambda 1$ through $\lambda 8$), on a separate output line. The eight demultiplexer output signals are provided to, respectively, eight birefringent devices such as birefringent crystals 514a through 514h. The birefringent crystals 514a through 514h separate the vertically and horizontally polarized components of the light which they receive and output a horizontally polarized component 516a (indicated in FIG. 5 by a short line) and a vertically polarized component 518a (indicated in FIG. 5 by a dot). Each of these components is then provided to one of the pixels of a double pixel polarization rotator 520a. Each pixel of the double pixel rotator will, when active (indicated, in FIG. 5 by shading), rotate light by 90° (i.e., rotate horizontal polarization to vertical polarization and rotate vertical polarization to horizontal polarization). The double pixel polarization rotators are controllable, preferably so that either the top pixel or the bottom pixel (but not both) (in the view of FIG. 5) is active. In the configuration depicted in FIG. 5, the uppermost input double pixel polarization rotator 520a has been controlled so that the upper pixel is active and the bottom pixel is nonactive and, as a result, both the upper and lower beams exiting the double pixel polarization rotator 520a are horizontally polarized. The two horizontally polarized beams are provided to a polarization beam splitter (PBS) 522a. The polarization beam splitter 522a is configured such that horizontally polarized light will pass straight through. Since both beams from $\lambda 1$ reach the polarization beam splitter 522a in a horizontal polarization, both beams pass straight through. A second (output) double pixel polarization rotator (524a, configured oppositely to 520a, with the active pixel on the bottom) and a second birefringent crystal 526a act to recombine the beams so that, in the configuration of FIG. 5, the signal reaching the upper input line 528a of the multiplexer 532 is identical to the upper output line 513a of the demultiplexer 512. Thus in the configuration of FIG. 5a, with respect to the first channel, the device acts as or provides a bridge function.

The configuration of the components associated with the second through fourth and sixth through eighth channels ($\lambda 2$ through $\lambda 4$, $\lambda 6$ through $\lambda 8$) are controlled to be identical to that of the first channel, $\lambda 1$, and the signals on the input lines of the multiplexer 532, for these channels, are all substantially identical to the corresponding output lines from the demultiplexer 512, providing a bridge function for these channels as well. As seen in FIG. 5, however, the double pixel polarization rotator associated with the fifth channel $\lambda 5$ 520e has been controlled so that the upper pixel is inactive and the lower pixel is active. As will be seen below, the effect (combined with other controlled elements described below) is to divert the fifth channel signal $\lambda 5$ to the drop port 534. As seen in FIG. 5, the effect of changing the configuration of the fifth channel double pixel polarization rotator 520e is that both output beams will have a vertical polarization (indicated by dots in FIG. 5). The corresponding polarization beam splitter 522e reflects the vertical polarized light downward through an (active) single pixel polarization rotator 536e which converts the light to horizontal polarization. The horizontally polarized light accordingly passes straight through (downward in the view of FIG. 5) the subsequent polarization beam splitters 522f, g, h and the horizontally polarized beams (originating from channel λ5) reach a beam combiner made up of a controllable double pixel polarization rotator 538 and a birefringent crystal 542 to combine the beams so that the drop port 534 outputs a signal identical to the fifth channel signal λ5.

In the configuration of FIG. 5, the device is further configured so that a signal provided to the add port will be sent to the fifth input line of the multiplexer 528e. The signal from the add port 544 passes through a birefringent crystal 546 and a double pixel rotator 548 to provide two beams both of which are horizontally polarized. These beams pass through the first four polarization beam splitters 522a through 522d and through the first three single pixel polarization rotators (which are, in the configuration of FIG. 5, controlled to be inactive 536a,b,c). The fourth single pixel polarization rotator, however, 536d is controlled to be active and accordingly, the beams output (downward) from a fourth single pixel polarization rotator 536d are vertically polarized. This results in the fifth polarization Seam splitter 522e reflecting the add port signal to the right (in the view of FIG. 5) where the two beams are recombined (by double pixel polarization rotator 524e and birefringent crystal 526e) to provide a recombined add signal at the fifth input 528e of the multiplexer 532.

If it was desired to change the add/drop configuration such that the add signal was sent to the third multiplexer input 528c and the third demultiplexer output λ3 was sent to the drop port 534, this would be achieved by switching the configuration of the third and fifth input double pixel polarization rotators 520c, 520e, the third and fifth output double pixel polarization rotators 524c,d inactivating the single pixel rotators before and after the fifth polarization beam splitter 536d, 536e and activating the single pixel polarization rotators before and after the third polarization beam splitter 536b,c. As can be seen from this example, changing the add/drop configuration in this manner will affect (and possibly interrupt) the channels directly involved in the change, i.e. channels 3 and 5, but will have no effect on the remaining channels 1, 2, 4, 6, 7 and 8 so that signal transmission can remain substantially continuous on those channels.

Figure 9:
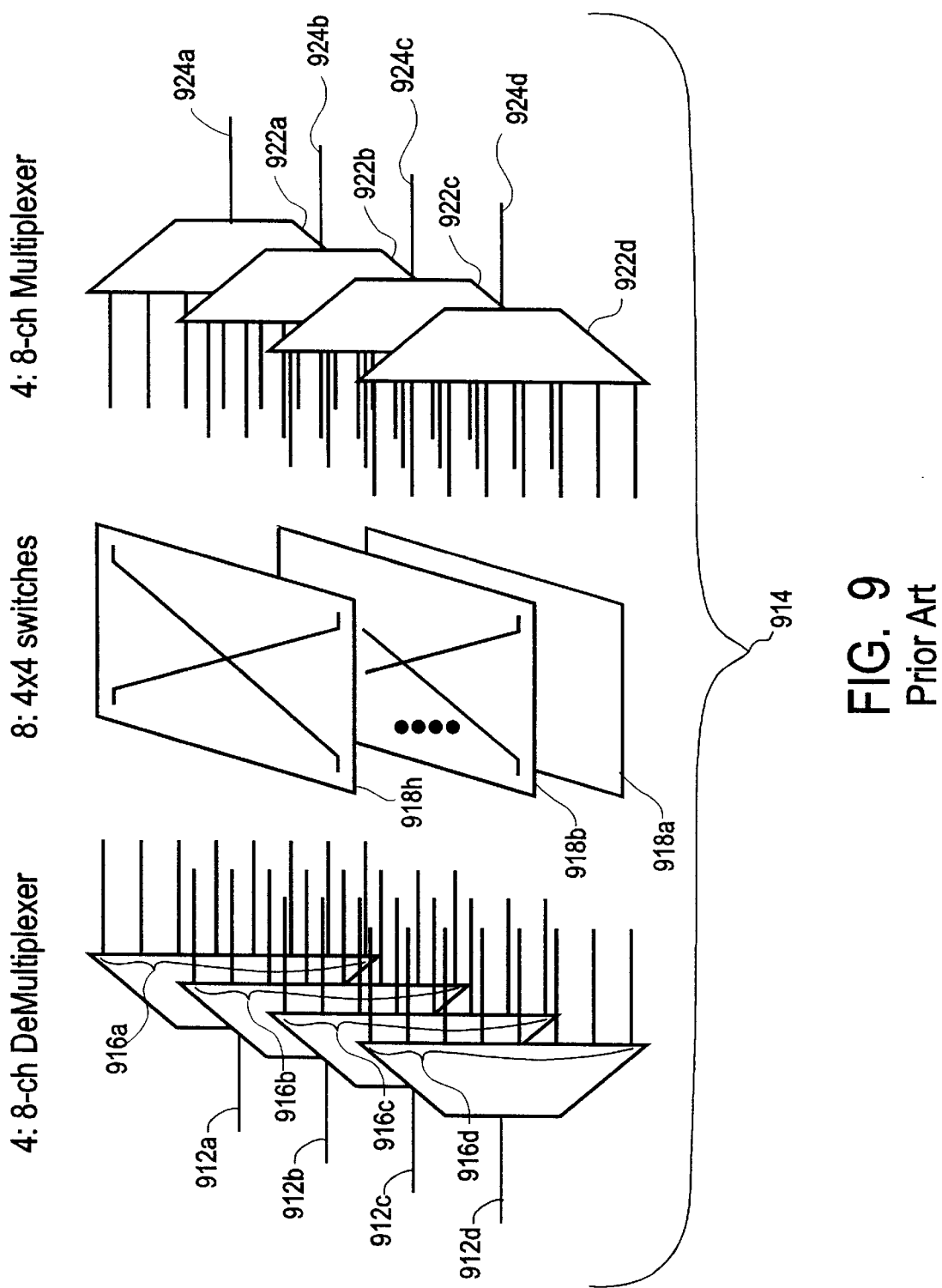
FIG. 9 depicts an application using a multiplexer according to an embodiment of the present invention for optical crossconnect.

FIG. 9 illustrates an application for a multiplexer. Four fibers 912a–d each carrying an 8-channel DWDM optical signal enter the optical node 914 for wavelength exchange. The DWDM signals are first demultiplexed to form four sets 916a–d of eight separated wavelengths. Each of the λ1, i=1 to 8 (four each), is input to one of eight 4×4 optical switches 918a,b,c,d,e,f,g,h, such that they can be exchanged or rerouted to a designated output multiplexer 922a–d and exit to the output fibers 924a–d.

Figure 10:
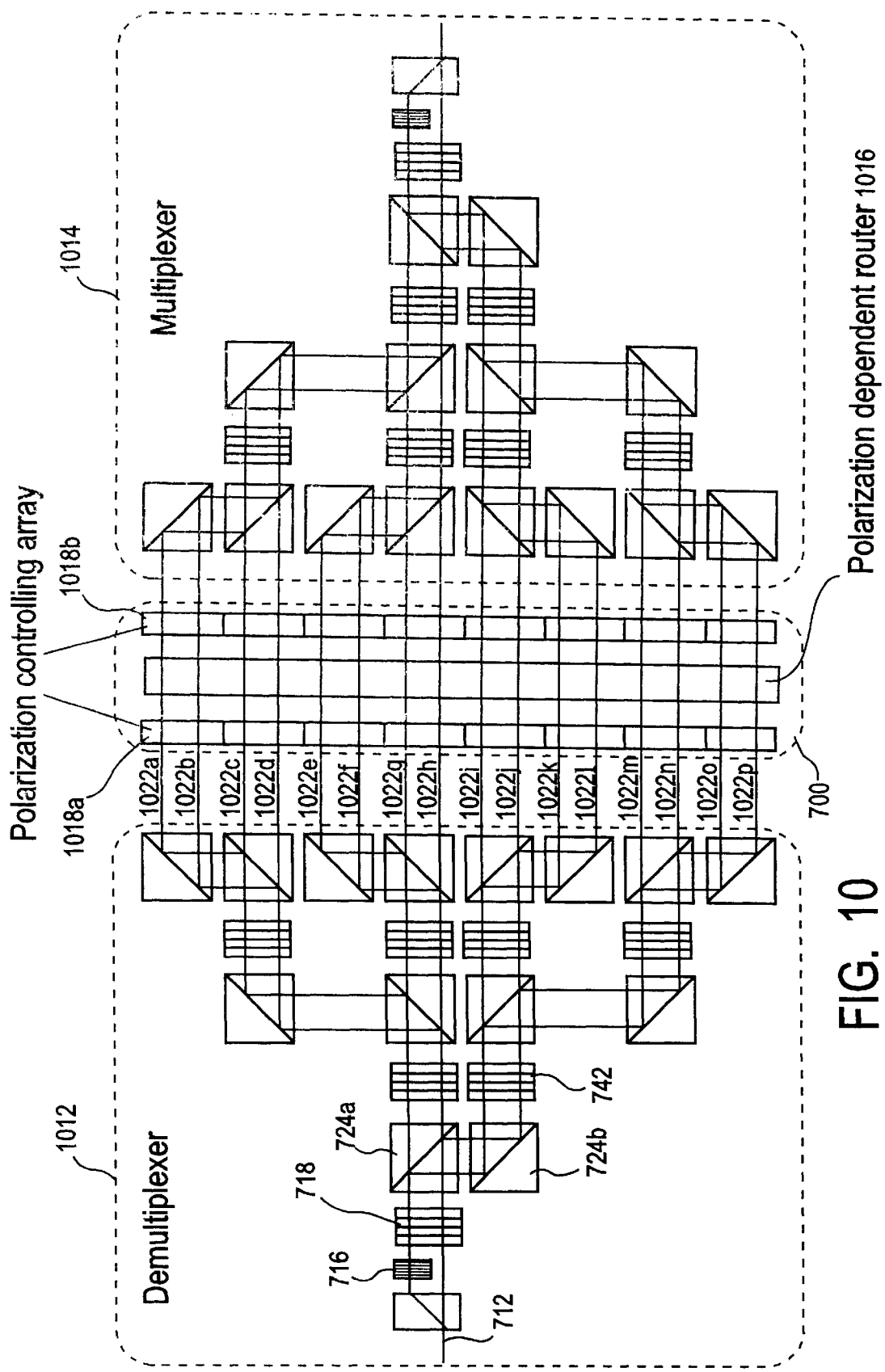
FIG. 10 is a schematic plan view of a programmable wavelength add/drop multiplexer according to an embodiment of the present invention.
Figure 12:
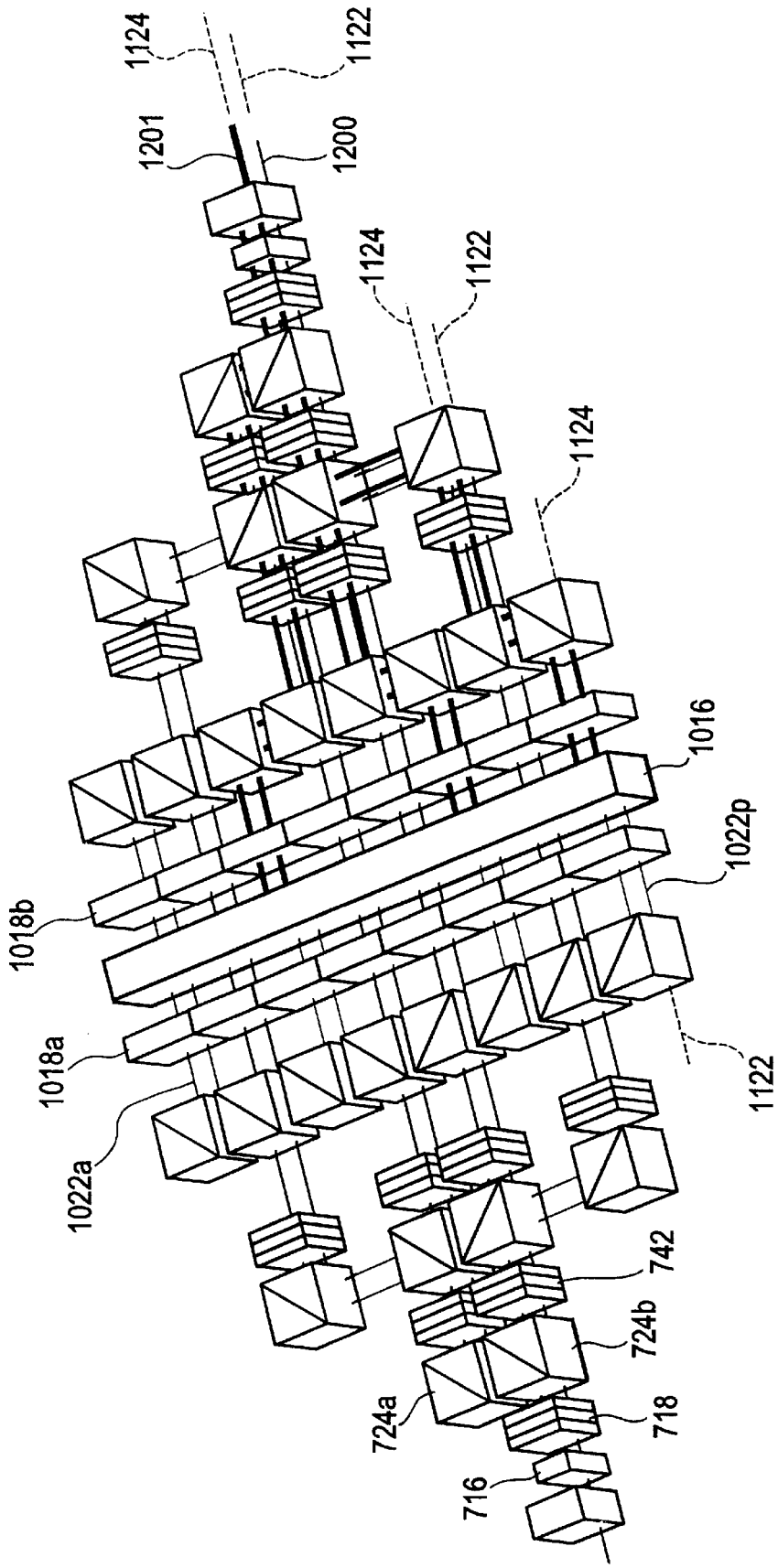
FIG. 12 is a perspective view of the programmable wavelength add/drop multiplexer of FIG. 10.

FIGS. 10 and 12 illustrate in plan and perspective views, respectively, a new architecture for a programmable wavelength add/drop multiplexer based on the multiplexer and demultiplexer shown in FIG. 7. In FIG. 10, multiplexer/demultiplexer 1012, 1014 are configured similarly to the device 600 depicted in FIG. 7, but shown with the last polarization converter array and the final birefringent element removed. In between the demultiplexer 1012 and multiplexer 1014, a polarization dependent router 1016, coupled to two polarizations controlling arrays 1018a,b is inserted to perform the wavelength routing function. At each output of the demultiplexer, optical channels are spatially separated with each assigned to have either vertical 1022a, b,e,f,i,j,m,n or horizontal 1022c,d,g,h,k,l,o,p polarization.

Figure 11B:
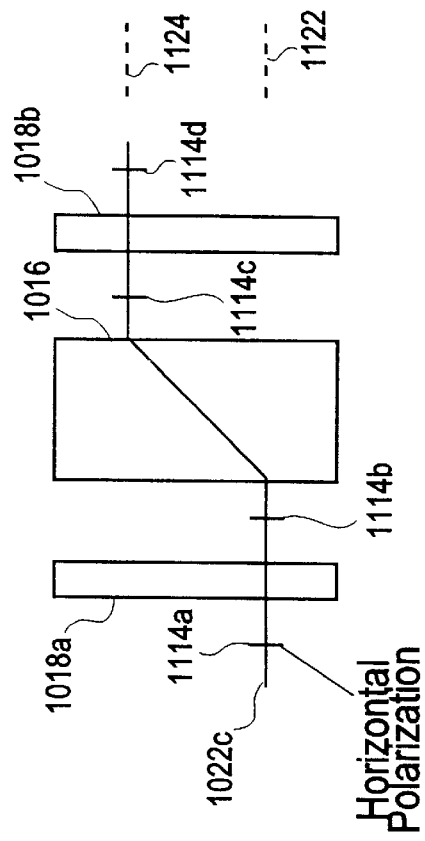
FIG. 11 is a side view of a portion of the programmable wavelength add/drop multiplexer illustrated in FIG. 10.
Figure 11D:
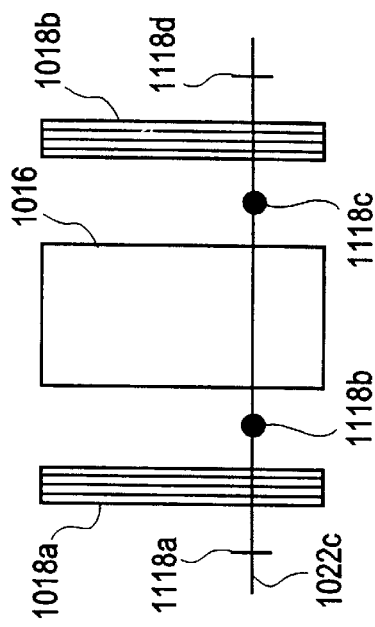
Figure 11A:
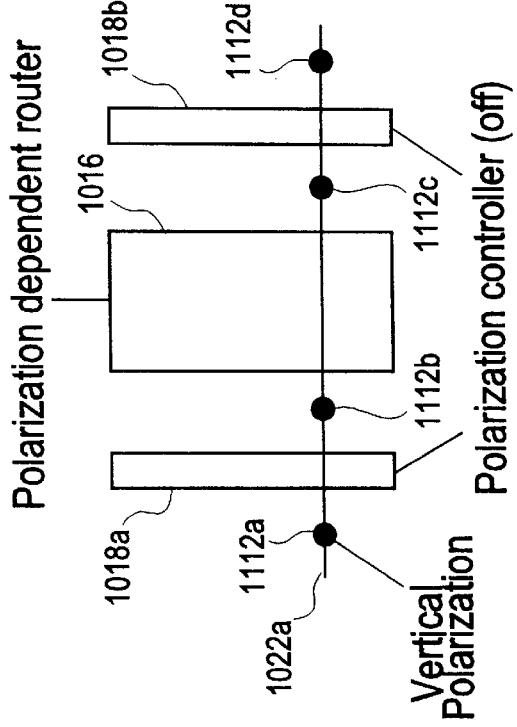
Figure 11C:
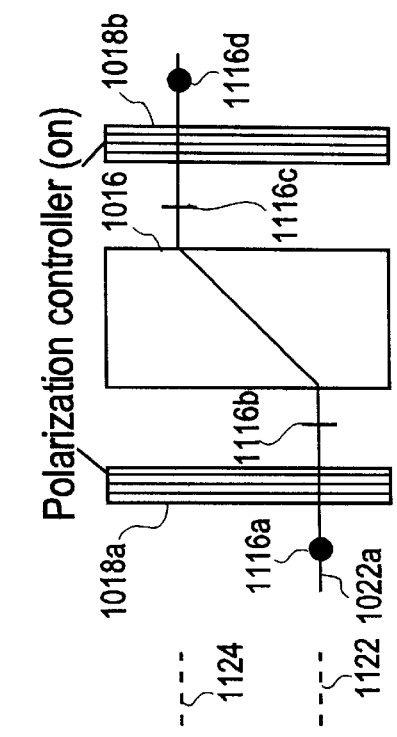

As can be seen in the partial side view of elements of the central component 700, provided in FIG. 11A–D, the optical paths can be altered by controlling the polarization of the lightwave through the polarization controlling array and the following polarization dependent router. Therefore, an individual channel can be selected to route to upper (FIG. 11B,C) or lower (FIG. 11A,D) levels depending on the polarization router 700. In the views of FIGS. 11A–D, the beam displacer 1016 is configured such that, upon receiving a beam with vertical polarization (indicated, in FIGS. 11A,D by dots 1112b, 1118b) the beam is passed straight through, but upon receiving a beam with horizontal polarization (indicated in FIGS. 11B,C by a short line 1114b, 1116b), the beam is deflected upward from a lower level 1122 to an upper level 1124. FIGS. 11A–D illustrate use of polarization controllers 1018a, 1018b to achieve routing. In FIG. 11A, the first polarization rotator 1018a is in an inactive or off state so that, upon receiving a vertically polarized beam 1022a, the beam is passed on with the same (vertical) polarization to the displacer 1016, which passes the beam straight through. When it is desired to route the vertical polarized beam 1022a to the upper level 1124, the first polarization rotator 1018a is switched (e.g. in response to a control bit) to an active or on state which, as shown in FIG. 11C changes the vertical polarization 1116a to horizontal polarization 1116b. As described above, the displacer 1016 responds to input of a horizontally polarized beam by displacing it to the upper level 1124, as depicted in FIG. 11C. Preferably a second polarization controller 1018b changes the horizontally polarized beam 1116c back to the original (vertical) polarization 1116d (e.g. to facilitate beam recombination at a later stage). Similarly, although a horizontally polarized beam 1022c is displaced to the upper level 1124 (thick lines in FIG. 12) when the polarization controller 1018a is off (as shown in FIG. 11B), when it is desired to avoid such displacement (e.g. for routing purposes), the corresponding section or pixel of the first polarization controller 1018a is put in an on state, as depicted in FIG. 11D, to change the horizontal polarization 1118a to vertical polarization 1118b, thus avoiding displacement in the polarization beam displacer 1016. Preferably, a second polarization controller is activated to return the beam to its original (horizontal) polarization 1118d (e.g. to facilitate beam recombination, at a later stage). In this arrangement any or all of the 8 input optical channels can be selectably (programmably) routed individually to either the upper 1124 or lower level 1122 and exit at the two output parts 1200, 1201 of the multiplexer as shown in FIG. 12.

In light of the above description, a number of advantages of the present invention can be seen. The present invention makes it feasible to provide demultiplexing and/or multiplexing functions with respect to relatively narrow bandwidth channels such as channels with center frequencies separated by 100 GHz, 50 GHz or less. The present invention provides for optical channel demultiplexing with reduced risk or incidence of cross-talk and frequency drift. The present invention provides demultiplexing which is substantially scalable, such as providing for demultiplexing arbitrarily small channel bandwidths by adding additional channel separating stages. The present invention provides for an effective optical channel demultiplexer which is entirely or substantially passive, preferably requiring no control and no power. The present invention enables manipulation of channels such as dynamic add/drop manipulation while avoiding affecting, interrupting, or otherwise perturbing channels which are not involved in the change. The arbitrarily dynamic add/drop operation is believed to be not widely available (if at all) in existing devices. A double staged polarization routing element is believed to provide the potential for a high contrast ratio for the optical signal routing. For example, two or more stages might be used to reduce channel cross-talk below that which would be typical for a single-staged polarization routing element (which might result in channel cross-talk of, e.g., about 20dB.)

A number of variations and modifications of the present invention can be used. Although a single stage filter is presented in the device illustrated in FIGS. 10–12, a double stage (or more) filter design can further shape the transmission function to obtain better channel isolation. A double stage design in this context will be understood by those of skill in the art after reviewing the present specification and/or U.S. Pat. No. 5,694,233. Although examples and illustrations have been provided showing devices that involve demultiplexing a WDM signal with 8 channels separated by 100 GHz, it is possible to use some or all features of the present invention in connection with other types of WDM signals such as signals having more or fewer channels, signals with wider or narrower channel separation, signals with unequal channel separation or channel bandwidth and the like. Although the description includes a filter which separates all even numbered channels from all odd-numbered channels, other wavelength filter configurations can be provided such as those which separate every third, fourth or higher numbered channel from remaining channels, wavelengths which separate some but not all even-numbered channels from remaining channels and the like. Conventionally, it is very difficult to (e.g. individually) separate the closed DWDM optical channels (using, e.g. conventional filtering techniques), especially when the channel spacing is on the order of 50 GHz (0.4 nm at 1550 nm window). The inter-digitation separation technique described herein solves this difficulty by effectively increasing the channel separation as the DWDM signal passes through each of the filters. After (preferably 2 or more) stages of separation, the channel spacing is far enough (~200 GHz or 400 GHz spacing) that the final channel separation can be achieved through conventional filtering techniques, if desired.

Figure 6C:
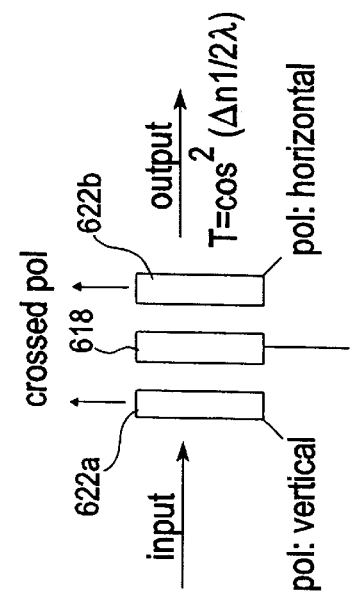
FIGS. 6B and C schematically depict devices with a single birefringent element placed between parallel and crossed polarizers, respectively.
Figure 6B:
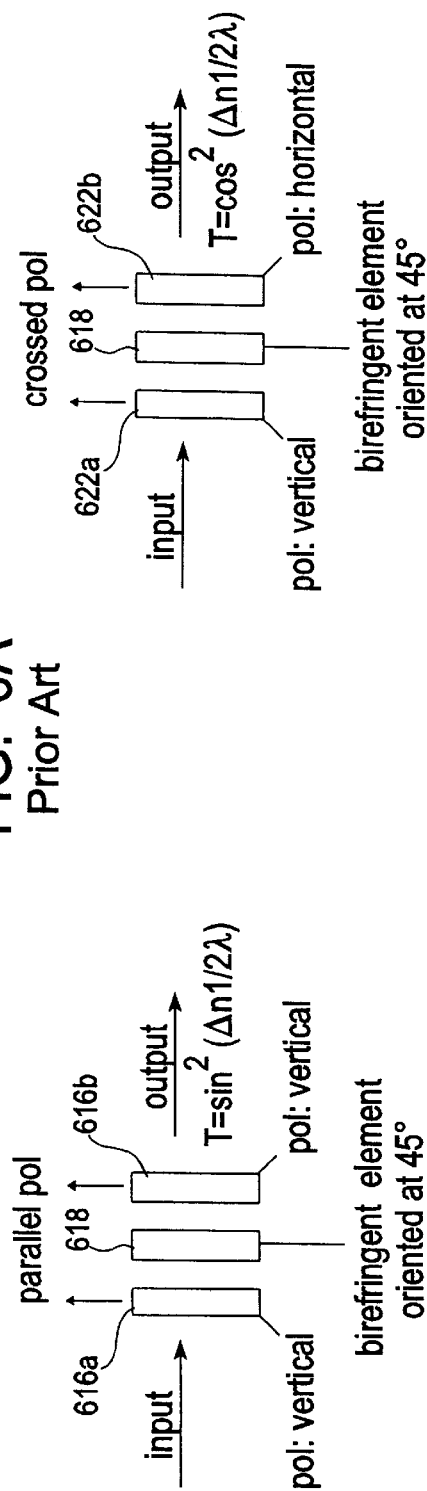

Although a stacked waveplate device for providing alternating channels with different polarizations has been described, other devices can be used for this purpose such as polarization fiber, e.g. panda fiber and bow-tie fiber can be used. A single waveplate element (e.g. as illustrated in FIGS. 6B and 6C) is typically less expensive than a stacked waveplate device, but results in transmission lobes which are sinusoidally shaped (FIGS. 6A), rather than the generally more desirable flatter-topped lobes which can be achieved with stacked waveplates. Although liquid crystal controllable polarization rotators have been described, other controllable polarization rotators can be used such as magnito-optic or electro-optic polarization rotators. Although polarization beam splitters have been described in connection with an add/drop and other implementations, other devices for changing beam direction based on polarization can be used such as polarization beam displacers. Although a multiplexer has been described which is substantially identical to the demultiplexer (but in reverse order), it is possible to use the demultiplexer of the present invention in connection with other types of multiplexers (such as multi-layers dielectric thin-fiber filters or grating base filters) or without a corresponding multiplexer.

While the application has been described by way of a preferred embodiment and certain variations and modifications, other variations and modifications can also be used in the invention being defined by the following claims:

What is claimed is:

1. A method for wavelength routing, comprising:
   receiving first and second components of each of a plurality of wavelength channels;
   routing components having a first polarization in a first direction;
   routing components having a second polarization in a second direction;
   rotating the polarization of at least one component of each wavelength channel routed in the first direction;
   combining the first and second components of each wavelength channel propagated in the first direction; and
   multiplexing a plurality of wavelength channels to form at least one output signal.

2. The method of claim 1, further comprising:
   demultiplexing an input optical signal into the plurality of wavelength channels, wherein each wavelength channel propagates along a different path;
   spatially separating each wavelength channel into first and second components, wherein the first component of each wavelength channel has a first polarization and the second component of each wavelength channel has a second polarization transverse to the first polarization; and
   rotating the polarization of at least one component of each wavelength channel such that the first and second components of each wavelength channel have the same polarization prior to the steps of receiving and routing.

3. The method of claim 1, wherein the first and second components of a particular wavelength channel have the second polarization such that they are routed in the second direction, the method further comprising rotating the polarization of the first and second components of the particular wavelength channel such that they are routed toward a drop port.

4. The method of claim 3, further comprising:
   rotating the polarization of at least one component of the particular wavelength channel; and
   combining the first and second components of the particular wavelength channel to form a drop signal.

5. The method of claim 3, further comprising:
   receiving an add signal comprising first and second components; and
   rotating the polarization of the components of the add signal such that they are routed in the first direction.

6. The method of claim 5, further comprising:
   spatially separating the add signal into the first and second components; and
   rotating the polarization of at least one component of the add signal.

7. The method of claim 5, wherein the add signal comprises a wavelength spectrum substantially equal to a wavelength spectrum associated with the particular wavelength channel.

8. An optical add/drop device comprising:
   a demultiplexer which receives a multi-channel optical input having a first channel spacing and separates said input into even and odd channel signals, each with a channel spacing twice said first channel spacing and further outputs each channel on a different path;

a birefringent device arrangement to divide each channel into relatively displaced vertically and horizontally polarized components;

a first plurality of controllable polarization rotators for receiving each of said vertically and horizontally polarized components of each channel, controlled to rotate polarization of one of said components for each channel to output, for each channel, two signals in the same polarization;

a plurality polarization beam splitters, with one such beam splitter positioned adjacent each channel path, configured to pass signals in a first polarization substantially straight through and to displace signals in a second polarization 90 degrees;

a controllable polarization rotator between each of said plurality of beam splitters, controlled to an active state before and after a beam splitter corresponding to a channel where an add/drop function is desired;

an add signal port coupled to a first of said polarization beam splitters by a birefringent crystal for dividing said add signal into vertically and horizontally polarized components, and a controllable polarization rotator, controlled to rotate polarization of one of said components of said add signal to provide two signals in the same polarization;

a drop signal port coupled to a last of said polarization beam splitters by a controllable polarization rotator, controlled to rotate polarization of one of said components of said add signal to provide two signals in different polarizations, and a birefringent combiner;

a second plurality of controllable polarization rotators for receiving first and second components of each channel from said polarization beam splitters, controlled to rotate polarization of one of said components for each channel to output, for each channel, two signals in different polarizations;

a plurality of birefringent combiners for receiving signals from said second plurality of controllable polarization rotators and combining said signals to output a single signal for each channel, each on a different output path; and a multiplexer for combining said output paths to output a plurality of channels on a single WDM output.

9. A programmable wavelength add/drop multiplexer comprising:

a demultiplexer which receives a multi-channel optical signal having a first channel spacing and repeats multiple stages of separating input into differently polarized even and odd channel signals, until vertically and horizontally polarized components of each channel is output on a different path;

a first array of polarization controlling elements respectively aligned with each said different path;

a birefringent beam displacer for receiving signals from each of said elements of said first array, wherein signals received in a first polarization are passed substantially straight through and signals received in a second polarization are displaced;

a second array of polarization controlling elements positioned to receive output from said birefringent beam displacer; and a multiplexer unit for receiving signals from said second array and outputting at least a first multi-channel signal.

10. A programmable wavelength add/drop multiplexer, as claimed in claim 9, wherein said multiplexer unit outputs at least a second multi-channel signal spatially displaced from said at least one multi-channel signal.

11. A programmable wavelength add/drop multiplexer, as claimed in claim 10 wherein at least said first array of polarization controlling elements include means for individually controlling polarization of at least some of said components, to provide for selectable routing to a first or a second level for ultimately outputting in said at least one or said second multi-channel signal, respectively.

12. A programmable wavelength add/drop multiplexer, as claimed in claim 10 wherein said components of each channel are output from said demultiplexer on paths spaced apart substantially in a first plane and wherein said at least one multi-channel signal and said second multi-channel signal are spaced apart substantially in a second plane different from said first plane.

13. A programmable wavelength add/drop multiplexer, as claimed in claim 12 wherein said first and second planes are substantially perpendicular.

14. An optical add/drop device, comprising:

a demultiplexer operable to receive an input optical signal comprising a plurality of wavelength channels and to output each wavelength channel on a different path;

a first plurality of birefringent elements, each birefringent element operable to spatially separate a wavelength channel into first and second components, wherein the first component of each wavelength channel has a first polarization and the second component of each wavelength channel has a second polarization transverse to the first polarization;

a first plurality of polarization rotators, each rotator operable to rotate the polarization of at least one component of a wavelength channel such that the first and second components of each wavelength channel have the same polarization;

a plurality of polarization based routing elements, each routing element operable to receive the first and second components of a corresponding wavelength channel, wherein components received having the first polarization are propagated in a first direction and components received having the second polarization are propagated in a second direction.

15. The device of claim 14, further comprising:

a second plurality of polarization rotators, each operable to rotate the polarization of at least one component of a wavelength channel propagated in the first direction;

a second plurality of birefringent elements, each operable to combine the first and second components of a wavelength channel propagated in the first direction; and a multiplexer operable to receive a plurality of wavelength channels and to form at least one output signal comprising a plurality of wavelength channels.

16. The device of claim 15, further comprising a third plurality of polarization rotators, each positioned between a pair of polarization based routing elements, wherein:

the first and second components of a particular wavelength channel have the second polarization such that they are propagated in the second direction by a particular polarization based routing element;

at least one of the third plurality of polarization rotators adjacent to the particular polarization based routing element is operable to rotate the polarization of the first and second components of the particular wavelength channel such that they propagate toward a drop port.

17. The device of claim 16, further comprising:
- a drop port polarization rotator operable to rotate the polarization of at least one component of the particular wavelength channel; and
- a drop port birefringent element operable to combine the first and second components of the particular wavelength channel to form a drop signal.

18. The device of claim 16, wherein at least one of the third plurality of polarization rotators adjacent to the particular polarization based routing element is operable to receive an add signal comprising first and second components and to rotate the polarization of the components of the add signal such that they are propagated in the first direction by the particular polarization based routing element.

19. The device of claim 18, further comprising:
- an add port birefringent element operable to spatially separate the add signal into the first and second components; and
- an add port polarization rotator operable to rotate the polarization of at least one component of the add signal such that the first and second components propagate toward the particular polarization based routing element.

20. The device of claim 18, wherein the add signal comprises a wavelength spectrum substantially equal to a wavelength spectrum associated with the particular wavelength channel.

21. An optical add/drop device, comprising:
- a plurality of polarization based routing elements, each routing element operable to receive first and second components of a corresponding wavelength channel, wherein components received having a first polarization are propagated in a first direction and components received having a second polarization are propagated in a second direction;
- a plurality of polarization rotators, each operable to rotate the polarization of at least one component of a wavelength channel propagated in the first direction;
- a plurality of birefringent elements, each operable to combine the first and second components of a wavelength channel propagated in the first direction; and
- a multiplexer operable to receive a plurality of wavelength channels and to form at least one output signal comprising a plurality of wavelength channels.

22. The device of claim 21, further comprising:
- a demultiplexer operable to receive an input optical signal comprising a plurality of wavelength channels and to output each wavelength channel on a different path;
- a second plurality of birefringent elements, each birefringent element operable to spatially separate a wavelength channel into first and second components, wherein the first component of each wavelength channel has a first polarization and the second component of each wavelength channel has a second polarization transverse to the first polarization; and
- a second plurality of polarization rotators, each rotator operable to rotate the polarization of at least one component of a wavelength channel such that the first and second components of each wavelength channel have the same polarization upon receipt by a corresponding polarization based routing element.

23. The device of claim 21, further comprising a second plurality of polarization rotators, each positioned between a pair of polarization based routing elements, wherein:
- the first and second components of a particular wavelength channel have the second polarization such that they are propagated in the second direction by a particular polarization based routing element;
- at least one of the second plurality of polarization rotators adjacent to the particular polarization based routing element is operable to rotate the polarization of the first and second components of the particular wavelength channel such that they propagate toward a drop port.

24. The device of claim 23, further comprising:
- a drop port polarization rotator operable to rotate the polarization of at least one component of the particular wavelength channel; and
- a drop port birefringent element operable to combine the first and second components of the particular wavelength channel to form a drop signal.

25. The device of claim 24, wherein at least one of the second plurality of polarization rotators adjacent to the particular polarization based routing element is operable to receive an add signal comprising first and second components and to rotate the polarization of the components of the add signal such that they are propagated in the first direction by the particular polarization based routing element.

26. The device of claim 25, further comprising:
- an add port birefringent element operable to spatially separate the add signal into the first and second components; and
- an add port polarization rotator operable to rotate the polarization of at least one component of the add signal such that the first and second components propagate toward the particular polarization based routing element.

27. The device of claim 25, wherein the add signal comprises a wavelength spectrum substantially equal to a wavelength spectrum associated with the particular wavelength channel.

28. A method for wavelength routing, comprising:
- demultiplexing an input optical signal into a plurality of wavelength channels, wherein each wavelength channel propagates along a different path;
- spatially separating each wavelength channel into first and second components, wherein the first component of each wavelength channel has a first polarization and the second component of each wavelength channel has a second polarization transverse to the first polarization;
- rotating the polarization of at least one component of each wavelength channel such that the first and second components of each wavelength channel have the same polarization;
- routing the components of each wavelength channel having the first polarization in a first direction; and
- routing the components of each wavelength channel having the second polarization in a second direction.

29. The method of claim 28, further comprising:
- rotating the polarization of at least one component of each wavelength channel routed in the first direction;
- combining the first and second components of each wavelength channel routed in the first direction; and
- multiplexing a plurality of wavelength channels to form at least one output signal.

30. The method of claim 28, wherein the first and second components of a particular wavelength channel have the second polarization such that they are routed in the second direction, the method further comprising rotating the polarization of the first and second components of the particular wavelength channel such that they are routed toward a drop port.

31. The method of claim 30, further comprising:
rotating the polarization of at least one component of the particular wavelength channel; and
combining the first and second components of the particular wavelength channel to form a drop signal.

32. The method of claim 30, further comprising:
receiving an add signal comprising first and second components; and
rotating the polarization of the components of the add signal such that they are routed in the first direction.

33. The method of claim 32, further comprising:
spatially separating the add signal into the first and second components; and
rotating the polarization of at least one component of the add signal.

34. The method of claim 32, wherein the add signal comprises a wavelength spectrum substantially equal to a wavelength spectrum associated with the particular wavelength channel.

35. A wavelength routing device, comprising:
a demultiplexer operable to receive an input optical signal comprising a plurality of wavelength channels and to output first and second components of each wavelength channel along different paths;
a first plurality of polarization rotators, each rotator operable to rotate the polarization of at least one of the first and second components of a wavelength channel such that the first and second components of each wavelength channel have one of a first polarization and a second polarization;
at least one polarization based routing element operable to receive first and second components of at least one wavelength channel, wherein components received having the first polarization are propagated in a first direction and components received having the second polarization are propagated in a second direction; and
a multiplexer operable to combine the components of the wavelength channels propagating in the first direction into a first output optical signal, and further operable to combine the components of the wavelength channels propagating in the second direction into a second output optical signal.

36. The device of claim 35, further comprising a second plurality of polarization rotators, each operable to rotate the polarization of at least one of the first and second components of a wavelength channel if the polarization of at least one of the components was rotated by one of the first plurality of polarization rotators.

37. The device of claim 35, wherein the demultiplexer further comprises:
at least one filter that receives the input optical signal and, substantially simultaneously, provides a first signal comprising a first plurality of the wavelength channels in the first polarization and provides a second signal comprising a second plurality of the wavelength channels, different from the first plurality, in the second polarization;
at least one polarization displacer which receives the first and second signals and displaces the path of the second signal with respect to the path of the first signal.

38. The device of claim 35, wherein the multiplexer further comprises:
at least one polarization displacer operable to displace at least a first pair of components propagating in the first direction and at least a second pair of components propagating in the first direction onto a common path;
at least one filter operable to receive the components propagating on the common path and to provide first and second signals with the same polarization.

39. The device of claim 35, wherein at least one of the first plurality of polarization rotators operates in response to a control signal.

40. A method for wavelength routing, comprising:
demultiplexing an input optical signal into a plurality of wavelength channels such that first and second components of each wavelength channel propagate along different paths;
rotating the polarization of at least one of the first and second components of a wavelength channel such that the first and second components of each wavelength channel have one of a first polarization and a second polarization;
routing components having the first polarization in a first direction;
routing components having the second polarization in a second direction;
combining the components of the wavelength channels routed in the first direction into a first output optical signal; and
combining the components of the wavelength channels routed in the second direction into a second output optical signal.

41. The method of claim 40, further comprising rotating the polarization of at least one of the first and second components of a wavelength channel subsequent to the steps of routing if the polarization of at least one of the components was rotated prior to the steps of routing.

42. The method of claim 40, wherein the step of demultiplexing further comprises:
receiving the input optical signal;
providing a first signal comprising a first plurality of the wavelength channels in the first polarization;
providing a second signal comprising a second plurality of the wavelength channels, different from the first plurality, in the second polarization; and
displacing the path of the second signal with respect to the path of the first signal.

43. The method of claim 40, wherein the first step of combining further comprises:
displacing at least a first pair of components propagating in the first direction and at least a second pair of components propagating in the first direction onto a common path;
receiving the components propagating on the common path; and
providing first and second signals with the same polarization.

44. The method of claim 40, wherein the step of rotating is performed in response to a control signal.

* * * * *

UNITED STATES PATENT AND TRADEMARK OFFICE
CERTIFICATE OF CORRECTION

PATENT NO.      : 6,552,833 B2
DATED           : April 22, 2003
INVENTOR(S)     : Jian-Yu Liu, Kuang-Yi Wu and Charles Wong It is certified that error appears in the above-identified patent and that said Letters Patent is hereby corrected as shown below:

<u>Title page,</u>
Item [76], Inventors, insert -- [73] Assignee: Chorum Technologies, LP, Richardson, Texas --.

Signed and Sealed this

Twenty-third Day of December, 2003

JAMES E. ROGAN
*Director of the United States Patent and Trademark Office*